(12) United States Patent
Ståhl

(10) Patent No.: US 9,807,059 B2
(45) Date of Patent: Oct. 31, 2017

(54) DEVICE, SOFTWARE MODULE, SYSTEM OR BUSINESS METHOD FOR GLOBAL REAL-TIME TELECOMMUNICATION

(71) Applicant: IPalive AB, Sundbyberg (SE)

(72) Inventor: Karl Erik Ståhl, Varmdo (SE)

(73) Assignee: IPALIVE AB., Sundbyberg (SE)

( * ) Notice: Subject to any disclaimer, the term of this patent is extended or adjusted under 35 U.S.C. 154(b) by 0 days.

(21) Appl. No.: 14/007,726

(22) PCT Filed: Jan. 17, 2013

(86) PCT No.: PCT/IB2013/000167
§ 371 (c)(1),
(2) Date: Sep. 26, 2013

(87) PCT Pub. No.: WO2013/108121
PCT Pub. Date: Jul. 25, 2013

(65) Prior Publication Data
US 2014/0344913 A1    Nov. 20, 2014

Related U.S. Application Data

(60) Provisional application No. 61/587,524, filed on Jan. 17, 2012, provisional application No. 61/731,119, filed on Nov. 29, 2012.

(51) Int. Cl.
*H04L 29/06* (2006.01)
*H04L 29/12* (2006.01)
*H04L 12/14* (2006.01)

(52) U.S. Cl.
CPC .......... *H04L 63/029* (2013.01); *H04L 12/141* (2013.01); *H04L 12/1403* (2013.01);
(Continued)

(58) Field of Classification Search
CPC ........... H04L 12/1403; H04L 29/12367; H04L 61/106; H04L 65/1006; H04L 65/1009; H04L 65/1013; H04L 69/18
See application file for complete search history.

(56) References Cited

U.S. PATENT DOCUMENTS 6,751,475 B1 * 6/2004 Holmes ............... H04M 1/6091
455/406
7,047,561 B1    5/2006 Lee
(Continued)

FOREIGN PATENT DOCUMENTS

CN        101116296        1/2008
JP        2008-515246      5/2008
(Continued)

OTHER PUBLICATIONS

International Preliminary Report on Patentability dated Jul. 22, 2014, 1 page.
(Continued)

*Primary Examiner* — Eleni Shiferaw
*Assistant Examiner* — Mary Li

(57) ABSTRACT

A telecommunication device for real-time communication at a border between a global transport network and a private domain of a communication network may include a proxy for a communication protocol, means for traffic using real-time communication protocols to traverse a firewall, means for real-time traffic initiated by the communication protocol to traverse a firewall, means for measuring and collecting value information about the real-time traffic over the global transport network, means for creating mutual trust between the telecommunication device and a second device with which it communicates; and means for authorizing usage of a feature for a mutually trusted communication participant.

40 Claims, 13 Drawing Sheets

(52) U.S. Cl.
CPC ...... *H04L 12/1471* (2013.01); *H04L 12/1485* (2013.01); *H04L 61/2514* (2013.01); *H04L 61/2575* (2013.01); *H04L 61/2589* (2013.01); *H04L 63/126* (2013.01); *H04L 65/103* (2013.01); *H04L 65/104* (2013.01); *H04L 65/1006* (2013.01); *H04L 65/1009* (2013.01); *H04L 65/1013* (2013.01); *H04L 65/1016* (2013.01); *H04L 65/1043* (2013.01); *H04L 65/1069* (2013.01); *H04L 65/4076* (2013.01); *H04L 61/106* (2013.01); *H04L 61/605* (2013.01)

(56) References Cited

U.S. PATENT DOCUMENTS

| | | | | |
|---|---|---|---|---|
| 2005/0105465 | A1* | 5/2005 | Eriksson | H04L 12/14 370/229 |
| 2005/0229248 | A1* | 10/2005 | Coley | G06Q 20/027 726/21 |
| 2006/0146792 | A1* | 7/2006 | Ramachandran | H04L 12/6418 370/352 |
| 2006/0193323 | A1* | 8/2006 | Lee | H04L 29/06027 370/392 |
| 2006/0274899 | A1* | 12/2006 | Zhu | H04L 9/083 380/281 |
| 2007/0019545 | A1* | 1/2007 | Alt | H04L 12/4633 370/230 |
| 2007/0189520 | A1* | 8/2007 | Altberg | G06Q 30/02 380/30 |
| 2007/0195800 | A1* | 8/2007 | Yang et al. | 370/401 |
| 2009/0319674 | A1 | 12/2009 | Yahyaoui et al. | |
| 2010/0157926 | A1* | 6/2010 | Eronen | H04L 29/12471 370/329 |
| 2011/0010461 | A1* | 1/2011 | Lassila et al. | 709/231 |

FOREIGN PATENT DOCUMENTS

| | | |
|---|---|---|
| JP | 2011-525776 | 9/2011 |
| WO | 2006/020975 | 2/2006 |
| WO | 2007/063176 | 6/2007 |

OTHER PUBLICATIONS

Written Opinion of the International Searching Authority dated Jul. 31, 2014, 4 pages.
Written Opinion of the International Searching Authority dated May 21, 2013, 4 pages.
Declaration of Non-Establishment of International Search Report dated May 21, 2013, 3 pages.
Notification of Transmittal of the International Search Report and the Written Opinion dated May 21, 2013, 4 pages.
European Office Action dated Apr. 12, 2017 in corresponding European Patent Application No. 13 707 914.1, 6 pages.
Chinese Office Action dated Jul. 14, 2016 in corresponding Chinese Patent Application No. 201380005409.6, 9 pages.
Japanese Office Action dated Jan. 10, 2017 in corresponding Japanese Patent Application No. 2014-552709, 3 pages.
Chinese Office Action issued May 15, 2017 in corresponding Chinese Patent Application No. 201380005409.6, 3 pages.

* cited by examiner

| | Function-module 200 |
|---|---|
| 201 | responding to an authenticating request from a service provider |
| 202 | responding to a verification request from a service provider |
| 203 | authenticating a communication participant |
| 204 | responding to an authentication request from a communication participant |
| 205 | creating global mutual trust between the telecommunication device and a communication participant |
| 206 | authorizing usage of a feature for a communication participant |
| 207 | routing real-time traffic between two communication participants |
| 208 | collecting user feedback |
| 209 | collecting votes |
| 210 | compiling call detail records that can be used by a service provider for a monitoring purpose |
| 211 | compiling call detail records that can be used by a service provider for a billing purpose |
| 212 | verifying the program for creating and delivering call detail records |
| 213 | delivering call detail records |
| 214 | delivering the call detail records over the global transport network using a secure protocol such as TR-069, Diameter or SFTP |
| 215 | delivering the call detail records to a party different than the transport network service provider |
| 216 | delivering the call detail records to several parties |
| 217 | converting a telephone number to an address on the global transport network |
| 218 | converting a first form of address to an address on the global transport network |
| 219 | retrieving an address on the global transport network by external data base lookup |
| 220 | retrieving an address on the global transport network by ENUM lookup |
| 221 | responding to authentication requests for permission to use an external data base for converting an address |
| 222 | routing a communication session (e.g. a call, a message, a gaming application, or other application) to a destination over the global transport network |
| 223 | classifying traffic based on a service to which a user of the telecommunication device is subscribed |
| 224 | classifying traffic based on a protocol used |
| 225 | classifying traffic based on an interface used |
| 226 | classifying traffic based on an address used by a caller |
| 227 | classifying traffic based on a port used by a caller |
| 228 | classifying traffic based on in which order traffic channels are set up |
| 229 | classifying traffic based on the number of traffic channels that are set up |
| 230 | classifying traffic based on the identity of a communication participant |
| 231 | classifying traffic based on a quality marking of data packets that are received |
| 232 | prioritizing traffic by placing prioritized data packets before other data packets in a queue |
| 233 | prioritizing traffic by marking data packets |
| 234 | prioritizing traffic by selecting a specific protocol |
| 235 | prioritizing traffic by reserving bandwidth |
| 236 | prioritizing traffic by selecting a specific network |
| 237 | prioritizing traffic by selecting a specific subnet |
| 238 | prioritizing traffic by selecting a specific network interface |
| 239 | registering user's current location |
| 240 | providing a service of a PBX |
| 241 | adding location information to an emergency call or message |
| 242 | forwarding location information of an emergency call or message |
| 243 | intercepting a call for eavesdropping |
| 244 | intercepting a message for interpreting |
| 245 | measuring and collecting value information about the real-time traffic over the global transport network |
| 246 | creating mutual trust between the telecommunication device and a communication participant |
| 247 | authorizing usage of a feature for a mutually trusted communication participant |

Fig. 4

| Function-module 710 | |
|---|---|
| 711 | managing charges for said communication session |
| 712 | informing a user about charges for said communication session |
| 713 | allowing said second user to accept said communication session with or without said charge being charged said user initiating said communication session |
| 714 | allowing said user initiating said communication session to cancel said communication session if said charge for acceptance of said communication session will be charged said user initiating said communication session |
| 715 | selecting a quality level for a communication session over the global transport network |
| 716 | informing the user of the charge for a communication session during the communication session |
| 717 | allowing a user to change a charge or a quality level for traffic during a communication session |
| 718 | adapting a charge or a quality level based on a measured or an experienced quality of the communication session |
| 719 | presetting a maximum charge that the user has to pay for usage of a communication service |
| 720 | terminating usage of a communication service when a preset charge is reached |
| 721 | presetting a maximum charge that the user has to pay for a time period |
| 722 | inhibiting communication sessions for a remainder of a time period, that would impose further charging after a preset charge for a time period is reached |
| 723 | allowing the user to preselect whether a communication session shall be rejected, allowed with a charge imposed by said second user or allowed without any charge imposed by said second user |
| 724 | reducing the frequency of keep-alive packets to keep a path open through a firewall |

Fig. 9

DEVICE, SOFTWARE MODULE, SYSTEM OR BUSINESS METHOD FOR GLOBAL REAL-TIME TELECOMMUNICATION

CROSS-REFERENCE TO RELATED APPLICATIONS

This application is a National Stage of International Application No. PCT/IB2013/000167, filed Jan. 17, 2013, pending, which is based upon and claims the benefit of priority to U.S. Provisional Application Ser. No. 61/587,524, filed Jan. 17, 2012 and U.S. Provisional Application Ser. No. 61/731,119, filed Nov. 29, 2012, the disclosures of all of which are incorporated herein by reference in their entirety.

BACKGROUND

Field

This telecommunication device, software module, system or business method relates generally to the field of telecommunication.

Description of the Related Art

The current global telephone network, the PSTN (Public Switched Telephone Network), is built for voice communication of limited bandwidth (only 3.5 kHz). Broadband networks, e.g. the Internet, can also be used for real-time person-to-person communication, e.g. voice communication, often called VoIP (Voice over Internet Protocol). The Internet transports data between endpoints, regardless of the data content or the application and is therefore called a transport network.

Although such technology has the potential of multimedia communication beyond the Plain Old Telephony Service (POTS), e.g. video, presence and instant messaging, VoIP has been used by telecom operators to replace pieces of the PSTN, still only offering POTS. Many telecom operators have built their own VoIP network using softswitches and session border controllers (SBCs). These local VoIP networks primarily connect to each other for voice traffic, counting voice minutes for billing as part of an intermixed transport and business architecture, sometimes called Session Delivery Network (SDN).

IMS (Internet protocol Multimedia Subsystem) is one type of SDN. SDN and what is here described, applies to both fixed and wireless networks. Even Voice over LTE (Long-Term Evolution), (VoLTE), as defined for the telephony service over 4G (fourth generation) wireless networks, is an SDN.

SDN is based on specific services—mostly voice in form of plain telephony—being handled separately from other data that are transported by an overlay of various servers on top of general IP (Internet Protocol) networks. The SDN uses hardware and software, e.g. in form of softswitches and SBCs, while handling the signaling (the connection of parties) as well as when transporting the media (the packetized voice data).

The SDN transports a call through the overlay servers, instead of directly between the communicating parties, which a global transport IP network would be able to do without the overlay.

Furthermore, telephony type of services must be delivered into private IP networks, LANs (Local Area Networks) behind firewalls with their NATs (Network Address Translators). Firewalls generally block such communication, an issue that either has to be resolved by E-SBCs (Enterprise Session Border Controllers) at the edge of the private network or by some workaround method such as e.g. STUN (Session Traversal Utilities for NAT, RFC 5389), TURN (Traversal Using Relays around NAT, RFC 5766), ICE (Interactive Connectivity Establishment, RFC 5245) or far end NAT traversal. Far end NAT traversal use similar methods as the mentioned RFC recommendations, but initiated from the service side rather than the client side. RFCs (Request For Comments) are Internet standards defined by the IETF (Internet Engineering Task Force).

However, such workaround methods have drawbacks in generality and reliability and are generally based on keep-alive packets to keep paths open for incoming calls through the firewall, that reduce the battery stand-by time of mobile devices, since their sleep mode will not be utilized.

VPN (Virtual Private Networks) in form of private IP lines e.g. over MPLS (Multiprotocol Label Switching), or encrypted tunnels over public networks are sometimes used to resolve the NAT and firewall traversal issue more centrally in the network. In addition, VPN solutions are complex, costly and introduce problems and restrictions in themselves, by not utilizing the advantages provided by a global quality transport network. Furthermore, VPN solutions introduce security issues when the private LAN of the customer is moved into the service provider's space, often resulting in that customers want a firewall towards the VPN, again introducing the problems with real-time communication that the VPN solution was supposed to resolve.

The SDN, but not a global transport network like the Internet, may achieve the following functions: (i) allowing service providers to bill for their services, (ii) using a higher quality for real-time traffic than the best effort quality available over the Internet, (iii) only allowing subscribers to the joined group of service providers to participate in the communication, (iv) fulfilling lawful intercept requirements and (v) fulfilling emergency calling requirements.

In the SDN as well as the old PSTN, most of these functions are realized centrally inside the service provider's network.

SUMMARY

In one aspect, a telecommunication device for real-time communication at a border between a global transport network and a private domain of a communication network may include a proxy for a communication protocol, means for traffic using real-time communication protocols to traverse a firewall, means for real-time traffic initiated by the communication protocol to traverse a firewall, means for measuring and collecting value information about the real-time traffic over the global transport network, means for creating mutual trust between the telecommunication device and a second device with which it communicates; and means for authorizing usage of a feature for a mutually trusted communication participant.

In another aspect, a telecommunication device for transferring real-time traffic between a global transport network and a private domain of a communication network may include a proxy, the proxy handling requests and responses of a communication protocol, a traverser, the traverser allowing traffic using real-time communication protocols to traverse a firewall between the global transport network and the private domain of a communication network, a value-collector, the value-collector measuring real-time traffic over the global transport network and collecting value information, an authenticator, the authenticator creating mutual trust between the telecommunication device and a second device with which it communicates; and an authorizer, the authorizer authorizing usage of a feature for a mutually trusted communication participant.

In another aspect, a processor executes a program that performs a function such as responding to an authenticating request from a service provider, responding to a verification request from a service provider, authenticating a communication participant, responding to an authentication request from a communication participant, creating global mutual trust between the telecommunication device and a communication participant, authorizing usage of a feature for a communication participant, routing real-time traffic between two communication participants, collecting user feedback, collecting votes, compiling call detail records that can be used by a service provider for a monitoring purpose, compiling call detail records that can be used by a service provider for a billing purpose, verifying the program for creating and delivering call detail records, delivering call detail records, delivering the call detail records over the global transport network using a secure protocol, delivering the call detail records to a party different than the transport network service provider, delivering the call detail records to several parties, converting a telephone number to an address on the global transport network, converting a first form of address to an address on the global transport network, retrieving an address on the global transport network by external data base lookup, retrieving an address on the global transport network by ENUM lookup, responding to authentication requests for permission to use an external data base for converting an address, routing a call to a destination over the global transport network, classifying traffic based on a service to which a user of the telecommunication device is subscribed, classifying traffic based on a protocol used, classifying traffic based on an interface used, classifying traffic based on an address used by a caller, classifying traffic based on a port used by a caller, classifying traffic based on in which order traffic channels are set up, classifying traffic based on the number of traffic channels that are set up, classifying traffic based on the identity of a communication participant, classifying traffic based on a quality marking of data packets that are received, prioritizing traffic by placing prioritized data packets before other data packets in a queue, prioritizing traffic by marking data packets, prioritizing traffic by selecting a specific protocol, prioritizing traffic by reserving bandwidth, prioritizing traffic by selecting a specific network, prioritizing traffic by selecting a specific subnet, prioritizing traffic by selecting a specific network interface, registering users current location, providing a service of a PBX, adding location information to an emergency call or message, forwarding location information of an emergency call or message, intercepting a call for eavesdropping, and/or intercepting a message for interpreting.

In another aspect, a secure protocol used to deliver the call detail records is TR-069 (a Broadband Forum specification), Diameter (an IETF standard), and/or SFTP (Secure File Transfer Protocol).

In another aspect, authentication is based on an indicia of authenticity such as a shared secret, a password, a certificate, a chip card, a SIM card, a unique identifier, a MAC address, and/or an IP address.

In another aspect, the telecommunication device is located in the private domain of a communication network, where the global transport network is reached via a path in a firewall.

In another aspect, the path in the firewall is kept open by keep-alive packets through the firewall.

In another aspect, the frequency of the keep-alive packets between the telecommunication device and a user terminal at the private domain of a communication network is reduced.

In another aspect, a plurality of WAN interfaces connects to a plurality of global transport networks, at least one of the global transport networks having a different quality level.

In another aspect, real-time communication on the private domain of a communication network can be routed either via a WAN interface connected to an Internet or via a WAN interface connected to a higher-quality network.

In another aspect, a firewall protects the private domain of a communication network from unwanted traffic from the global transport network.

In another aspect, an access modem such as a DSL modem, a cable modem, a GPON modem, an Ethernet router, an optical fiber router, a MPLS router, and/or a T1 router connects to the global transport network.

In another aspect, a server is a SIP Server, a SIP registrar, a PBX, a presence server, and/or a call and message policy handler.

In another aspect, a gateway communicates with a second network, the gateway making the second network compatible with the telecommunication device.

In another aspect, the second network is the Public Switched Telephone Network.

In another aspect, a gateway communicates with a second device on the private domain of a communication network that is not directly compatible with the telecommunication device.

In another aspect, the second device is a telephone, a PBX, a device for the Public Switched Telephone Network, a device using the protocol H.323, a device using the protocol MGCP, and/or a device using a protocol that is not used by the telecommunication device.

In another aspect, a software module incorporated into the telecommunication device implements the functions of the telecommunication device.

In another aspect, a system for communication over a global transport network uses the telecommunication device.

In another aspect, a system for communication over a global transport network is used for a service such as a telephone call, a video conference call, a web browser call, a text message, a picture message, a voice message, a video message, a gaming application, and/or an application for real-time communication.

In another aspect, a business method for offering a charged communication service over a global transport network uses the telecommunication device.

In another aspect, the charged communication service is accessing the global transport network, text messaging, picture messaging, voice messaging, video messaging, real-time communication, voice communication, and/or video communication.

In another aspect, a user initiating a communication session of a communication service can be charged for a second user accepting the communication session.

In another aspect, a second user can influence the charge for the acceptance of the communication session.

In another aspect, a telecommunication device with a processor executes a program that performs a function such as retrieving information from a database about the charge for the acceptance of the communication session before completing the acceptance, transferring information about the charge for the acceptance of the communication session to the user initiating the communication session before completing the acceptance, and/or retrieving information from a database about both an address for the communication session and the charge for the acceptance of the communication session before completing the acceptance.

In another aspect, the revenue from the charged communication is shared based on a sharing model such as sharing a charge for a communication session between the service provider from which the session was initiated and second service provider where the session was accepted, sharing a service provider's revenue from subscriber-influenced charges for accepting a communication session with the subscriber that influenced the charge and accepted the session, sharing a service provider's revenue from charges for accepting a communication session with the subscriber that accepted the session, and/or sharing a service provider's revenue with the subscriber that generated the charges.

In another aspect, a management system for a telecommunication device also controls the access to the global transport network for the telecommunication device.

In another aspect, the management system authenticates the telecommunication device to allow access to the global transport network for the telecommunication device.

In another aspect, the management system validates a function of the telecommunication device to allow usage of the global transport network for the telecommunication device.

In another aspect, a telecommunication device at a border between a global transport network and a private domain of a communication network has a first endpoint in the private domain that communicates using real-time traffic with a second endpoint reachable via the global transport network, wherein the first and second endpoints use a first protocol for an intended real-time communication and a second protocol for traversing a firewall with the real-time traffic initiated by the first protocol, and wherein the second protocol is based on using a server at the global transport network, and the telecommunication device also has a responder and traverser for the second protocol that sets up a path between the global transport network and the private domain for real-time traffic initiated by the first protocol and informs the first endpoint of the address of the path on the global transport network.

In another aspect, a telecommunication device at a border between a global transport network and a private domain of a communication network has a first protocol that is SIP, WebRTC or another real-time signaling protocol and a second protocol that is a combination of STUN, TURN, ICE or other protocols for traversing NAT.

In another aspect, a telecommunication device at a border between a global transport network and a private domain of a communication network has a processor for executing a program, the program performing a function such as responding to an authenticating request from a service provider, responding to a verification request from a service provider, authenticating a communication participant, responding to an authentication request from a communication participant, creating global mutual trust between the telecommunication device and a communication participant, authorizing usage of a feature for a communication participant, routing real-time traffic between two communication participants, collecting user feedback, collecting votes, compiling call detail records that can be used by a service provider for a monitoring purpose, compiling call detail records that can be used by a service provider for a billing purpose, verifying the program for creating and delivering call detail records, delivering call detail records, delivering the call detail records over the global transport network using a secure protocol, delivering the call detail records to a party different than the transport network service provider, delivering the call detail records to several parties, converting a telephone number to an address on the global transport network, converting a first form of address to an address on the global transport network, retrieving an address on the global transport network by external data base lookup, retrieving an address on the global transport network by ENUM lookup, responding to authentication requests for permission to use an external data base for converting an address, routing a call to a destination over the global transport network, classifying traffic based on a service to which a user of the telecommunication device is subscribed, classifying traffic based on a protocol used, classifying traffic based on an interface used, classifying traffic based on an address used by a caller, classifying traffic based on a port used by a caller, classifying traffic based on in which order traffic channels are set up, classifying traffic based on the number of traffic channels that are set up, classifying traffic based on the identity of a communication participant, classifying traffic based on a quality marking of data packets that are received, prioritizing traffic by placing prioritized data packets before other data packets in a queue, prioritizing traffic by marking data packets, prioritizing traffic by selecting a specific protocol, prioritizing traffic by reserving bandwidth, prioritizing traffic by selecting a specific network, prioritizing traffic by selecting a specific subnet, prioritizing traffic by selecting a specific network interface, registering users current location, providing a service of a PBX, adding location information to an emergency call or message, forwarding location information of an emergency call or message, intercepting a call for eavesdropping, intercepting a message for interpreting, measuring and collecting value information about the real-time traffic over the global transport network, creating mutual trust between the telecommunication device and a communication participant, and/or authorizing usage of a feature for a mutually trusted communication participant.

In another aspect, a system for communication over a global transport network has user terminals, each of the user terminals having a processor for executing a program, the program performing a function such as managing charges for the communication session, informing a user about charges for the communication session, allowing the second user to accept the communication session with or without the charge being charged the user initiating the communication session, allowing the user initiating the communication session to cancel the communication session if the charge for acceptance of the communication session will be charged the user initiating the communication session, selecting a quality level for a communication session over the global transport network, informing the user of the charge for a communication session during the communication session, allowing a user to change a charge or a quality level for traffic during a communication session, adapting a charge or a quality level based on a measured or an experienced quality of the communication session, presetting a maximum charge that the user has to pay for usage of a communication service, terminating usage of a communication service when a preset charge is reached, presetting a maximum charge that the user has to pay for a time period, inhibiting communication sessions for a remainder of a time period, that would impose further charging after a preset charge for a time period is reached, allowing the user to preselect whether a communication session shall be rejected, allowed with a charge imposed by the second user or allowed without any charge imposed by the second user, and/or reducing the frequency of keep-alive packets to keep a path open through a firewall.

In another aspect, a telecommunication device for transferring real-time traffic between a global transport network and a private domain of a communication network has a proxy, the proxy handling requests and responses of a communication protocol, a traverser, the traverser allowing traffic using real-time communication protocols to traverse a firewall between the global transport network and the private domain of a communication network, a value-collector, the value-collector measuring real-time traffic over the global transport network and collecting value information, an authenticator, the authenticator creating mutual trust between the telecommunication device and a communication participant; and an authorizer, the authorizer authorizing usage of a feature for a mutually trusted communication participant.

The above-described embodiments of the present invention are intended as examples, and all embodiments of the present invention are not limited to including the features described above.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein:

FIG. 4 shows internal components of a function-module in a telecommunication device;

FIG. 7b shows a deduction from FIG. 7a;

FIG. 7d shows a combination deduced from FIG. 7a;

FIG. 9 shows internal components of a function-module in a user terminal; and

DETAILED DESCRIPTION OF THE PREFERRED EMBODIMENTS

Figure 1:
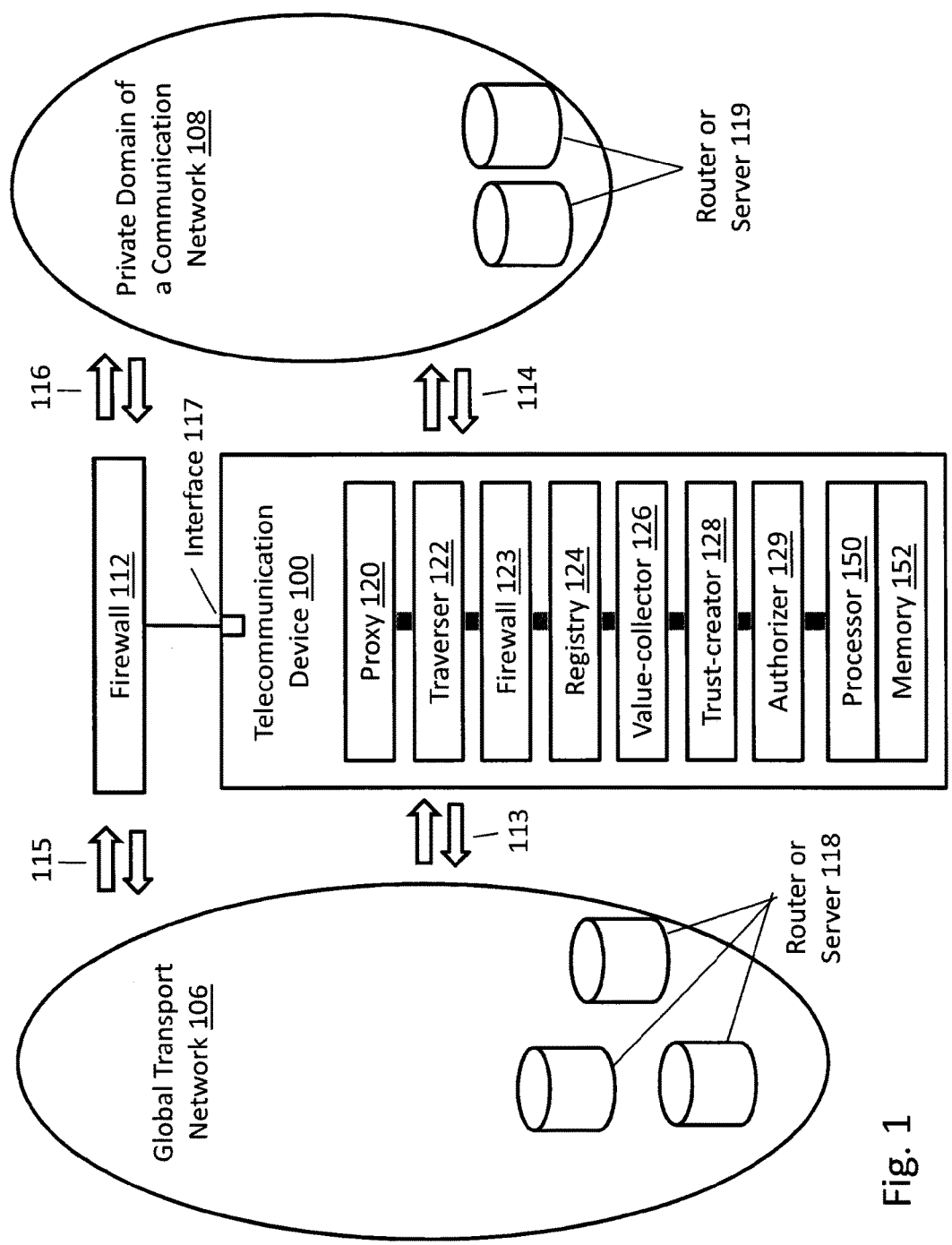
FIG. 1 shows a telecommunication device according to an embodiment.

A telecommunication device for real-time communication at a border between a global transport network and a private domain of a communication network is proposed.

For telecom operators to offer global multimedia communication, a global packet based telecommunication network with higher quality than the public Internet—a global transport network or WAN (Wide Area Network) with quality for real-time traffic is proposed. Real-time traffic can be voice, video, presence, instant messaging, game applications where low delay and low packet loss are important. Such global transport network may be the Internet, where real-time traffic is given priority over best effort traffic.

The private domain may be a local area network (a LAN) for users of a service, a LAN for a multimedia service provider, or a private channel to the WAN, e.g. via a wireless connection, a dialed up connection or via a VPN connection.

In the fixed broadband networks, the mentioned border, is between a LAN and a WAN (e.g. the Internet), where a firewall gives the LAN its protected private environment, but usually also hinders real-time communication using protocols like SIP, H.323, RTSP or WebRTC.

In the mobile wireless networks, the mentioned border is at the firewall in the land based part of the mobile network, between the Internet or OTT (Over The Top) broadband channel supplied to the mobile device (e.g. user terminals such as smart phones) via radio waves and a global WAN like the Internet. This firewall, often including NAT, is usually also hindering real-time communication using protocols like SIP, H.323, RTSP or WebRTC.

A multimedia service provider, not being part of an SDN, can provide its global services from a private domain, e.g. a LAN, having the telecommunication device at its border toward the global WAN transport network.

The proposed quality WAN consists of multiple telecom carriers having peered their quality networks, typically IP (Internet Protocol) networks. This is similar to the public Internet, but on the quality WAN, traffic can be given different priorities, e.g. by using IP level TOS (Type Of Service) or DSCP (DiffServ Code Point) packet marking or by reserving bandwidth, so that real-time traffic is prioritized over less critical data traffic. On the current public Internet, on the other hand, all packets have the same best effort priority.

The usage of such prioritized traffic should be charged differently from less critical traffic, to avoid that the highest priority will be used for all traffic, whereby real-time traffic could not be prioritized over other traffic.

Prioritization, the application being used and other factors are value information that can allow traffic to be charged differently than ordinary best effort data traffic.

To be able to charge and bill both the caller and called party for valuable traffic, there should be mutual trust between the telecommunication devices, communicating between each other over a global transport network. Mutual trust between the communication participants is also recommended for avoiding misuse of a service (e.g. unauthorized calling, SPAM calling or SPIT). Mutual trust, which in an SDN is created by coupling to a private SDN overlay network, should be created specifically when the telecommunication devices are communicating directly between each other over a global transport network to which also non trusted devices have access. Such mutual trust can be created e.g. by telecommunication devices checking the validity of each other's certificates before communicating with each other, using TLS (Transport Layer Security) where a CA (Certificate Authority) maintains a PKI (Public Key Infrastructure) structure where the validity of certificates that shall be trusted for a global telecommunication communication service can be checked.

The mutual trust between a telecommunication device and another communication participant on the public transport network is recommended for the common practice of telecommunication service provider's to bill each other, e.g.

when on service provider bills another service provider for accepting and deliver an incoming call.

Global mutual trust is also recommended—both when initializing and receiving calls—at international mobile phone roaming. Then a user connecting to a foreign mobile operator's network get extra charged by his own operator, both for calling and answering calls, fees which are settled between the operators.

When communicating directly between the telecommunication devices involving telecommunication operators, not using an SDN, the trust should be both mutual and global. Mutual trust is created when the telecommunication device authenticates a communication participant and also is being authenticated by the communication participant. Global mutual trust is when the authentication works between all operators participating (which may be one or many) in a telecommunication system over the global transport network.

The quality WAN may be connected to the public Internet via routers or gateways, or it may be an extension or improvement of the current Internet.

The system also includes functions in the user terminals, e.g. a fixed or mobile telephone, connected to the telecommunication devices, for handling calls with user determined charging. The terminal receiving an incoming call could include functions for notifying about the identity of the caller and for allowing for the user to accept the call without a charge, with a certain charge, or not at all. The calling terminal would include functions for notifying the caller of a possible charge and for allowing the caller to proceed with the call or to interrupt it.

In one aspect, a telecommunication device for real-time communication at a border between a global transport network and a private domain of a communication network, with means for real-time traffic to pass a firewall at the border and with capabilities for achieving functions selected from (i) allowing service provider to bill for their services, (ii) using a higher quality for real-time traffic than the best effort quality available over the Internet, (iii) only allowing subscribers to the joined group of service providers to participate in the communication, (iv) fulfilling lawful intercept requirements and (v) fulfilling emergency calling requirements. That allows for a real-time communication system, without using the costly and destructive overlay structure of softswitches and SBCs, whereby the reliability, quality, scalability and good performance of a global transport network is maintained. The system uses the telecommunication devices coupled to endpoints like telephones, computers, other user terminals and servers on private domains of a communication network and can incorporate or interoperate with existing services provided over the public Internet, the old PSTN, the wireless 2G, 3G and 4G networks and new services such as video telepresence calling.

For such system, the service provider would not have to invest in central equipment for an SDN or an IMS network, but instead provide e.g. DNS (Domain Name System) for address resolution, ENUM (E.164 Number Mapping) for number resolution, a PKI (Public Key Infrastructure) structure for managing trust and a management system for handling the telecommunication devices. Such network elements are usually already available and used in communication networks.

A telecommunication device for real-time communication at a border between a global transport network and a private domain of a communication network is proposed.

For telecom operators to offer global multimedia communication, a global packet based telecommunication network with higher quality than the public Internet—a global transport network or WAN (Wide Area Network) with quality for real-time traffic is proposed. Real-time traffic can be voice, video, presence, instant messaging, game applications where low delay and low packet loss are important. Such global transport network may be the Internet, where real-time traffic is given priority over best effort traffic.

The private domain may be a local area network (a LAN) for users of a service, a LAN for a multimedia service provider, or a private channel to the WAN, e.g. via a wireless connection, a dialed up connection or via a VPN connection.

In the fixed broadband networks, the mentioned border, is between a LAN and a WAN (e.g. the Internet), where a firewall gives the LAN its protected private environment, but usually also hinders real-time communication using protocols like SIP, H.323, RTSP or WebRTC.

In the mobile wireless networks, the mentioned border is at the firewall in the land based part of the mobile network, between the Internet or OTT (Over The Top) broadband channel supplied to the mobile device (e.g. user terminals such as smart phones) via radio waves and a global WAN like the Internet. This firewall, often including NAT, is usually also hindering real-time communication using protocols like SIP, H.323, RTSP or WebRTC.

A multimedia service provider, not being part of an SDN, can provide its global services from a private domain, e.g. a LAN, having the telecommunication device at its border toward the global WAN transport network.

The proposed quality WAN consists of multiple telecom carriers having peered their quality networks, typically IP (Internet Protocol) networks. This is similar to the public Internet, but on the quality WAN, traffic can be given different priorities, e.g. by using IP level TOS (Type Of Service) or DSCP (DiffServ Code Point) packet marking or by reserving bandwidth, so that real-time traffic is prioritized over less critical data traffic. Such function is well known and used, but it is not used on the current public Internet, where all packets have the same best effort priority.

The usage of such prioritized traffic should be charged differently from less critical traffic, to avoid that the highest priority will be used for all traffic, whereby real-time traffic could not be prioritized over other traffic.

Prioritization, the application being used and other factors are value information that can allow traffic to be charged differently than ordinary best effort data traffic.

To be able to charge and bill both the caller and called party for valuable traffic, there should be mutual trust between the telecommunication devices, communicating between each other over a global transport network. Mutual trust between the communication participants is also recommended for avoiding misuse of a service (e.g. unauthorized calling, SPAM calling or SPIT). Mutual trust, which in an SDN is created by coupling to a private SDN overlay network, should be created specifically when the telecommunication devices are communicating directly between each other over a global transport network to which also non trusted devices have access. Such mutual trust can be created e.g. by telecommunication devices checking the validity of each other's certificates before communicating with each other, using TLS (Transport Layer Security) where a CA (Certificate Authority) maintains a PKI (Public Key Infrastructure) structure where the validity of certificates that shall be trusted for a global telecommunication communication service can be checked.

The mutual trust between a telecommunication device and another communication participant on the public transport network is recommended for the common practice of telecommunication service provider's to bill each other, e.g. when on service provider bills another service provider for accepting and deliver an incoming call.

Global mutual trust is also recommended—both when initializing and receiving calls—at international mobile phone roaming. Then a user connecting to a foreign mobile operator's network get extra charged by his own operator, both for calling and answering calls, fees which are settled between the operators.

When communicating directly between the telecommunication devices involving telecommunication operators, not using an SDN, the trust should be both mutual and global. Mutual trust is created when the telecommunication device authenticates a communication participant and also is being authenticated by the communication participant. Global mutual trust is when the authentication works between all operators participating (which may be one or many) in a telecommunication system over the global transport network.

The quality WAN may be connected to the public Internet via routers or gateways, or it may be an extension or improvement of the current Internet.

The system also includes functions in the user terminals, e.g. a fixed or mobile telephone, connected to the telecommunication devices, for handling calls with user determined charging. The terminal receiving an incoming call could include functions for notifying about the identity of the caller and for allowing for the user to accept the call without a charge, with a certain charge, or not at all. The calling terminal would include functions for notifying the caller of a possible charge and for allowing the caller to proceed with the call or to interrupt it.

In one aspect, a telecommunication device for real-time communication at a border between a global transport network and a private domain of a communication network, with means for real-time traffic to pass a firewall at the border and with capabilities for achieving functions selected from (i) allowing service provider to bill for their services, (ii) using a higher quality for real-time traffic than the best effort quality available over the Internet, (iii) only allowing subscribers to the joined group of service providers to participate in the communication, (iv) fulfilling lawful intercept requirements and (v) fulfilling emergency calling requirements. That allows for a real-time communication system, without using the costly and destructive overlay structure of softswitches and SBCs, whereby the reliability, quality, scalability and good performance of a global transport network is maintained. The system uses the telecommunication devices coupled to endpoints like telephones, computers, other user terminals and servers on private domains of a communication network and can incorporate or interoperate with existing services provided over the public Internet, the old PSTN, the wireless 2G, 3G and 4G networks and new services such as video telepresence calling.

For such system, the service provider would not have to invest in central equipment for an SDN or an IMS network, but instead provide e.g. DNS (Domain Name System) for address resolution, ENUM (E.164 Number Mapping) for number resolution, a PKI (Public Key Infrastructure) structure for managing trust and a management system for handling the telecommunication devices. Such network elements are usually already available and used in communication networks.

Reference may now be made in detail to embodiments of the present invention, examples of which are illustrated in the accompanying drawings, wherein like reference numerals refer to like elements throughout.

A telecommunication device for global multimedia real-time telecommunication services to be offered by telecom operators is proposed to include capabilities such as delivering services to a private domain of a communication network.

Another capability of the telecommunication device is to receive and forward or respond to signaling requests in a proxy for a communication protocol, for example session initiation protocol (SIP), H.323, real-time streaming protocol (RTSP) or web-based real-time communication (WebRTC).

Another capability of the telecommunication device is to resolve the firewall traversal issues for real-time communication at the border between a global transport network and a private domain of a communication network. A firewall most often also includes network address translation (NAT), which further adds to the traversal issues.

Another capability of the telecommunication device is to measure and collect value information about the traffic over the global transport network so the operator, for example, can bill the customer for such traffic or limit the amount of valuable traffic not to exceed what a customer has subscribed to or prepaid for.

Another capability of the telecommunication device is to create mutual trust between the telecommunication device and a communication participant. A communication participant may be another telecommunication device, a server for a service, another device on the global transport network or a user terminal, which the telecommunication device communicates with.

Another capability of the telecommunication device is to authorize usage of a feature for a mutually trusted communication participant, where the feature may be transferring real-time traffic, receiving calls or messages, using a service or similar.

The resolution of the firewall traversal issues may all be in the telecommunication device itself or partly via an interface for opening paths for real-time traffic through a firewall.

The location of the telecommunication device is at the border between a global transport network or a WAN (wide area network) and a private domain of a communication network or a LAN (local area network), typically at a location where an ordinary firewall is located. The location is usually at a customer, at a private domain with a server for a service or where individual connections for each wireless terminal are created in a wireless network. The device can operate in parallel with an ordinary firewall or may be able to replace the firewall.

The proxy for a real-time communication protocol is included to allow functions to be implemented. A proxy receives and reads a signaling message for a specific protocol and can act on the information therein. The proxy can rewrite the message and then respond to or pass the message to an endpoint or to another proxy. The proxy may also have the ability to route the real-time traffic to its destination or to another proxy.

In one aspect, a system, business method, device or software module for global real-time communication over a global transport network includes one or several of the above mentioned functions in a telecommunication device at the border between the global transport network and a private domain of a communication network, where a firewall gives the private domain its protected private environment, but usually also hinders real-time communication using protocols like SIP (session initiation protocol), H.323, RTSP (real-time streaming protocol) or WebRTC (Web real-time communication).

The firewall does not allow traffic from the global transport network or the WAN side to enter the private domain at the LAN side unless it is correct traffic, and the traffic flow is initiated from the LAN side, or if the firewall is specifically configured to allow certain traffic to enter that LAN.

Further, if a network address translator (NAT) of a firewall is enabled, private addresses are used on the LAN, and so endpoints at the LAN cannot be directly addressed from the WAN side. One address on the WAN side is often shared by multiple endpoints on the LAN. Endpoints on the LAN, therefore have to initiate traffic from their side, before traffic can be received from the WAN side via the firewall using the path initiated from the LAN.

Ordinary firewalls therefore hinder real-time traffic, where an endpoint on a private domain like a LAN is to be called. The firewall usually blocks the call from the WAN side, and even if ports in the firewall are opened for incoming calls, the signaling message cannot, without special treatment, be passed on to the right endpoint at the LAN, when the NAT function in the firewall has made those addresses private.

In addition to the call set-up done by signaling messages, there is also the media part of real-time communication, such as voice streams that have to flow between the communicating endpoints. Media paths between the endpoints may be requested in the call setup signaling and opened by the telecommunication device, after being reviewed and modified by the proxy. However, an ordinary firewall is not aware of this and does not open such media paths.

Value information that is measured and collected may be the application used, the bandwidth used, the amount of traffic transferred, the type of traffic transferred, the prioritization used, and the quality parameters achieved during a communication session over the global transport network.

Mutual trust is based on that a telecommunication device checks and verifies the identity of the other communication participant and allows its own identity to be checked and verified, e.g. by using passwords or similar that are regularly changed or by using TLS (Transport Layer Security) where a CA (Certificate Authority) maintains a PKI (Public Key Infrastructure) structure where the validity of the communication participant's certificates can be verified.

Authorizing usage of a feature may be to allow a mutually trusted communication participant initiate or accept a communication session (e.g. a call, a message, a gaming application, or other application), to transfer real-time traffic and to use a service.

The telecommunication device, software module, system or business method to realize global real-time communication includes one or several of the following functions or methods at the border between a global transport network and a private domain of a communication network, such as:

delivering real-time multimedia communication to users or servers on a private domain of a communication network, by including session border controller (SBC) functionality for firewall and network address translation (NAT) traversal.

interfacing to a firewall that may be external to the telecommunication device for opening paths for real-time traffic through the firewall.

measuring and collecting value information, the usage of prioritized traffic, of an application, of a specific port or interface or other information showing a value of traffic beyond best effort data traffic typically used on the public Internet, allowing a service provider to charge or limit such usage authenticating a communication participant using an indicia of authenticity, e.g. a shared secret, a password, a certificate, a chip card, a SIM (subscriber identification module) card, a unique identifier, a MAC (Media Access Control) address, or an IP (Internet Protocol) address creating mutual trust by responding to authentication requests from a communication participant—that is or will be authenticated by the telecommunication device—using an indicia of authenticity, e.g. a shared secret, a password, a certificate, a chip card, a SIM card, a unique identifier, a MAC address, or an IP address.

authorizing usage of a feature for a mutually trusted communication participant where the feature e.g. may be transferring real-time traffic, receiving calls or messages, using a service or similar.

In FIG. 1 is shown a telecommunication device 100 for real-time communication at a border between a global transport network 106 and a private domain of a communication network 108 (e.g. LAN).

The telecommunication device 100 may include a processor 150, memory 152 both random and serial, hardware, and software. The random access memory may be, for example, a solid-state device. The serial access memory may be, for example, a disk. The processor 150 may be, for example, a microprocessor, a digital signal processor, or a CPU (central processing unit).

The various parts of the telecommunication device, such us the proxy 120, the traverser 122, the firewall 123, the registry 124, the value-collector 126, the trust-creator 128, authorizer 129, can be implemented in software modules running on the processor 150 and connected together.

The border may comprise a firewall 112. Traffic 113, 114, 115 and 116 may go in both directions between the global transport network 106 WAN side of the telecommunication device to the private domain of a communication network 108 on the LAN side of the telecommunication device.

The global transport network 106 may be comprised of a plurality of routers or servers 118. The routers or servers 118 may include processors, memory both random and serial, hardware, and software.

The private domain of a communication network 108 may be served by routers or servers 119, which may include a processor, memory both random and serial, hardware, and software. Users that wish to use real-time communication, like telephony (voice), video conferencing, instant messaging (IM), presence and similar applications, may be connected at the private domain of a communication network 108 and communicate with users on the global transport network 106, or most often with users connected to other private domains of a communication network, and those private domains of a communication network are connected to the global transport network.

In one embodiment, the telecommunication device 100 includes a traverser 122 that allows real-time traffic 113 and 114 to traverse the border between the global transport network 106 and the private domain of a communication network 108, through the telecommunication device 100, since real-time traffic do not go through the firewall 112.

The traverser 122 gets information from a proxy 120 or other means for inspecting and changing signaling messages to set-up real-time communication between parties on different sides of the traverser 122. Signaling messages contain information about participants in the communication. The traverser 122 has knowledge about the participants' addresses, which may be global or private on the private on the private domain 108 being served. The traverser 122 can instruct the firewall 123 to open paths between the parties for both the signaling and for the media. The proxy 120 will also change the signaling messages to match information such as addresses on the WAN side and the LAN side of the communication device before the signaling message is passed on.

The traverser 122 gets knowledge about the endpoint's private addresses on the private domain 108, either from configuration in registry 124 or from the endpoints having registered their addresses through a registration message to the registry 124, which may be a SIP registrar.

The firewall 123 may also include a NAT to perform the same translation between addresses on the global transport network 106 and private domain 108.

The telecommunication device 100 may also include a value-collector 126 for measuring and collecting value information about the real-time traffic over the global transport network. The value-collector 126 may also create call detail records (CDR:s) that can be used by a service provider for billing purposes, and deliver those CDR:s to the service provider. The value-collector 126 measures the traffic from and to WAN interfaces. It can store the application being used, what quality level that is requested and the quality that is delivered. It can measure both the totally transferred traffic, or traffic per session or per call. CDR:s can thereafter be created by combining such data with information from a proxy 120 or other means, about the caller and the called party, their addresses, the call duration, at which time it occurred and which WAN interface that was used.

The telecommunication device 100 may also include a trust-creator 128 for creating mutual trust between the telecommunication device and a communication participant. Mutual trust is created by checking and verifying the identity of the other communication participant and by allowing the identity of the telecommunication device 100 to be checked and verified.

The telecommunication device 100 may also include an authorizer 129 for authorizing usage of features such as transferring real-time traffic, receiving calls or messages, using a service or similar for a mutually trusted communication participant.

Figure 3:
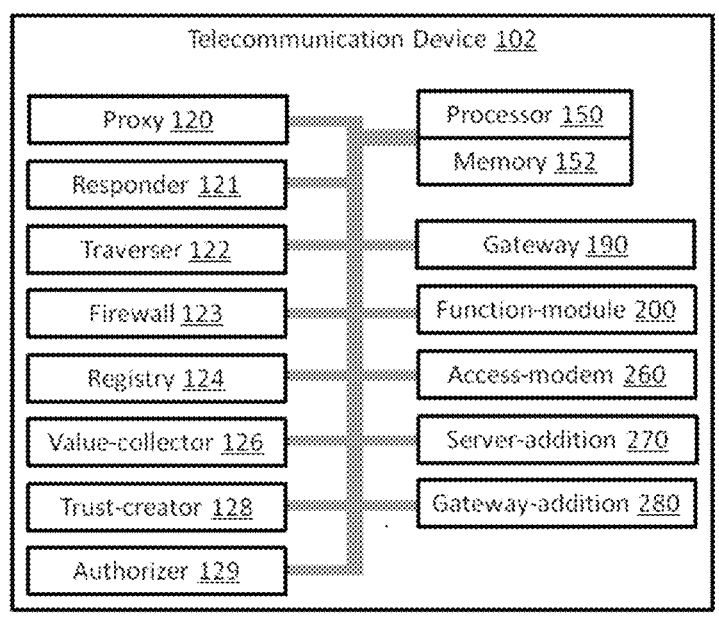
FIG. 3 shows a telecommunication device according to another embodiment.

As shown in FIG. 3, one embodiment of a telecommunication device 102 may also include a function-module 200, comprising programs for performing one or several of the following functions, such as those shown in FIG. 4:

201 responding to an authenticating request from a service provider,
202 responding to a verification request from a service provider,
203 authenticating a communication participant,
204 responding to an authentication request from a communication participant,
205 creating global mutual trust between the telecommunication device and a communication participant,
206 authorizing usage of a feature for a communication participant,
207 routing real-time traffic between two communication participants,
208 collecting user feedback,
209 collecting votes,
210 compiling call detail records that can be used by a service provider for a monitoring purpose,
211 compiling call detail records that can be used by a service provider for a billing purpose,
212 verifying the program for creating and delivering call detail records,
213 delivering call detail records,
214 delivering the call detail records over the global transport network using a secure protocol such as TR-069, Diameter or SFTP,
215 delivering the call detail records to a party different than the transport network service provider,
216 delivering the call detail records to several parties,
217 converting a telephone number to an address on the global transport network,
218 converting a first form of address to an address on the global transport network,
219 retrieving an address on the global transport network by external data base lookup,
220 retrieving an address on the global transport network by ENUM lookup,
221 responding to authentication requests for permission to use an external data base for converting an address,
222 routing a communication session (e.g. a call, a message, a gaming application, or other application) to a destination over the global transport network,
223 classifying traffic based on a service to which a user of the telecommunication device is subscribed,
224 classifying traffic based on a protocol used,
225 classifying traffic based on an interface used,
226 classifying traffic based on an address used by a caller,
227 classifying traffic based on a port used by a caller,
228 classifying traffic based on in which order traffic channels are set up,
229 classifying traffic based on the number of traffic channels that are set up,
230 classifying traffic based on the identity of a communication participant,
231 classifying traffic based on a quality marking of data packets that are received,
232 prioritizing traffic by placing prioritized data packets before other data packets in a queue,
233 prioritizing traffic by marking data packets,
234 prioritizing traffic by selecting a specific protocol,
235 prioritizing traffic by reserving bandwidth,
236 prioritizing traffic by selecting a specific network,
237 prioritizing traffic by selecting a specific subnet,
238 prioritizing traffic by selecting a specific network interface,
239 registering users current location,
240 providing a service of a PBX,
241 adding location information to an emergency call or message,
242 forwarding location information of an emergency call or message,
243 intercepting a call for eavesdropping,
244 intercepting a message for interpreting,
245 measuring and collecting value information about the real-time traffic over the global transport network,
246 creating mutual trust between the telecommunication device and a communication participant, and
247 authorizing usage of a feature for a mutually trusted communication participant.

The telecommunication device, software module, system or business method to realize global real-time communication may also include one or several of the following functions or methods, such as:

creating global mutual trust by accessing a common data base shared between a group of telecommunication service providers for verifying an indicia of authenticity, the shared data base consisting of e.g. one or several servers for RADIUS (Remote Authentication Dial In User Service, RFC 2865), one or several servers for Diameter (alternative to RADIUS, RFC 3588), or a public key infrastructure (PKI) for verifying certificates.

classifying traffic to determine the prioritization or quality level to be used or to determine the value of the traffic.

prioritizing real-time traffic and allowing prioritized traffic to communication participants.

reporting value information that could be formatted in call directory records (CDR:s), to allow usage to be billed to customers, to allow clearing of charges between different service providers to allow storage for fulfilling regulatory requirements of tracing communication or for similar purposes. The information collected in a CDR may be a communication session identity, the initiator, the recipient, the type of traffic, the amount of traffic, the quality level used for the traffic, measured quality parameters of the session, and the time and duration of the session.

CDR:s can thereafter be delivered, during or directly after the call, or later in a batch where many CDR:s have been collected. CDR:s can be delivered using protocols such as Radius or SIP Publish, or over a WAN using a secure protocol like TR-069, Diameter, or SFTP.

TR-069 is a protocol for management of customer placed equipment. It can receive CDR:s via inform messages and store the CDR:s in its database for further processing like billing by a service provider.

The value-collector 126 shown in FIG. 1 can also measure and limit usage or traffic without having to generate CDR:s, by e.g. counting the amount of valuable traffic that is transferred and if a preset amount is overridden—totally of per time period—block further quality traffic or impose a higher charge for continued quality traffic transfer.

A network provider may want to assure that the value-collector, the creation of CDR:s and their delivery, or other functions, are not falsified when a communication device is placed at a customer location. That can be done by authenticating the presence of a telecommunication device, its identity and its software. One method for such authentication may be via a management system that includes authentication methods. The TR-069 management protocol includes authentication of devices, their identity and allows the signature of software in the telecommunication device to be checked, and can assure that the CDR:s and their delivery are not tampered with. In case such functions have been tampered with, the access can be shut down by the management system.

In yet another embodiment of the telecommunication device 100, it may have an interface 117 to an external firewall 112, through which paths for real-time traffic can be opened in the external firewall 112. Thereby traffic 115 and 116 can be both of data and of real-time type and the internal firewall 123 can be excluded from the telecommunication device 100.

Figure 5:
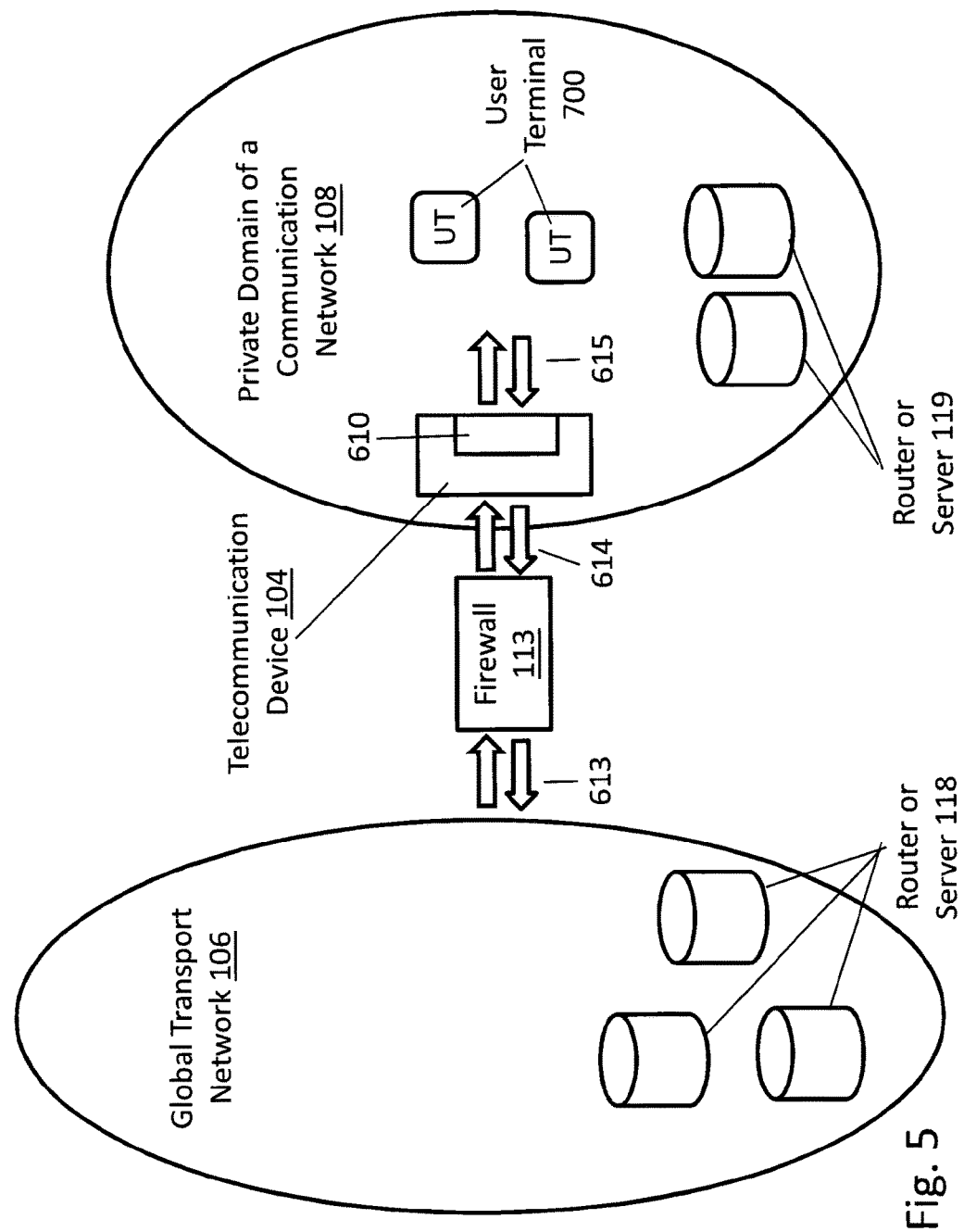
FIG. 5 shows a telecommunication device located in the private domain of communication network.

FIG. 5 shows the telecommunication device 104 located in the private domain of a communication network 108, reaching the border of a global transport network 106 via a path in a firewall 113. Such a path needs to be open to allow incoming communication sessions, but may not be open if there is not continuous traffic packets 613 and 614 through the path in the firewall 113 and the path is not statically configured in the firewall 113. It is therefore a common technique to keep such path open by keep-alive packets from a communication participant. Mobile user terminals, for which battery power consumption shall be kept low, are not in lowest power mode when sending or receiving keep-alive packets. The telecommunication device 104 may therefore have a function 610 for not passing on keep-alive packets to user terminals 700 at the private domain, or to reduce the frequency of keep-alive packets 615 sent to such user terminals. For real-time traffic from and to user terminals 700, the telecommunication device 104 is at the border between the global transport network and the private domain of a communication network.

There may be several global transport networks with different quality connected to the WAN side of the telecommunication device. The telecommunication device may route real-time traffic via a WAN interface connected to a high quality global transport network or (e.g. for cost reasons) via an interface connected to a lower quality global transport network (e.g. the Internet).

Figure 2:
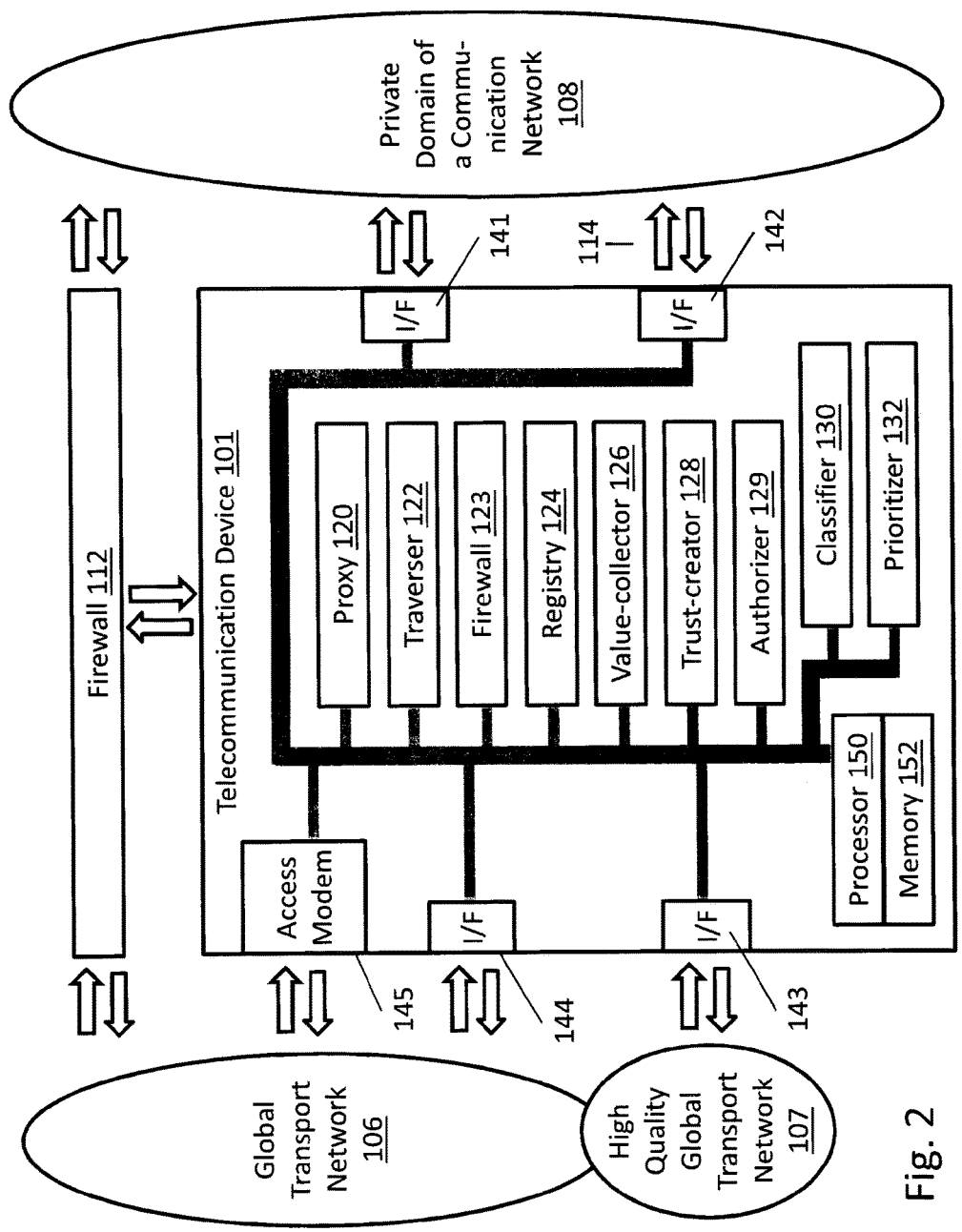
FIG. 2 shows a telecommunication device according to another embodiment.

In FIG. 2 is shown a telecommunication device 101 according to a further embodiment. As shown in FIG. 2, the telecommunication device 101 is at a border between a global transport network 106 and a private domain of a communication network 108. The border may comprise a firewall 112.

In addition to the proxy 120, the traverser 122, the firewall 123, the registry 124, the value-collector 126, the trust-creator 128, and the authorizer 129 described with respect to the telecommunication device 100 shown in FIG. 1, the telecommunication device 101 in FIG. 2 may also include a classifier 130, a prioritizer 132 and several WAN interfaces 143 and 144 for connecting to WAN:s with different quality levels.

The real-time communication, in one embodiment, may be via a first WAN interface 144 connected to the Internet and a second WAN interface 143 connected to a higher-quality network 107. An access modem 145 will function like a WAN interface.

The classifier 130 determines how traffic will be classified for handling by the prioritizer 132. The classifier 130 may classify real-time traffic over best effort traffic, based on the service or services to which a user is subscribed. In the alternative, the classifier 130 may classify the traffic 114 based on an interface 142 used, based on an address or a port used, based on the called party, or based on already existing quality marketing of the data packets when they are received through an interface 142. The proxy 120 or other means may give information to the classifier 130 about which protocols and which services are being used and which endpoints that participate. The classification may assign various quality levels to traffic and may also classify based on configuration of the telecommunication device.

The prioritizer 132 gives classified traffic priority over best effort traffic. The prioritizer 132 can both prioritize traffic internally in the telecommunication device 101 by arranging traffic in several outgoing queues to interfaces 141 to 144 and also by instructing the WAN side or LAN side networks to prioritize classified traffic. Such instruction can be by marking IP packets with TOS or DSCP bits, by requesting reservation of a certain bandwidth, by selecting a specific network or subnet, or by selecting a higher quality WAN through an alternative interface 143.

In another embodiment of the telecommunication device 100 shown in FIG. 1, the firewall 123 may also handle data traffic and protect the private domain of a communication network from unwanted traffic from the global transport network, and can thereby replace the firewall 112.

The embodiment 102 of the telecommunication device shown in FIG. 3, is preferably combined with, or built into, a firewall 123 or a routing proxy 120 (e.g. for SIP, H.323, RTSP or WebRTC), or an access modem 260 (e.g. a DSL modem, a cable modem, a GPON (Gigabit-capable Passive Optical Networks) modem, an Ethernet router, an optical fiber router, MPLS (Multiprotocol Label Switching) router, or a T1 router). A server-addition 270 (e.g. a SIP Server, a SIP registrar, a PBX (private branch exchange), a presence server, a call and message policy handler) or a gateway 190 for interoperability with a second network (e.g. the PSTN (Public Switched Telephone Network)), a gateway-addition 280 for interoperability with a device on the private domain of a communication network (e.g. a telephone, a PBX, a device for the public switched telephone network, a device using the protocol H.323, a device using the protocol MGCP (Media Gateway Control Protocol), or a device using a another protocol than the telecommunication device) may also be integrated.

An access modem 260 will function like a WAN interface connecting directly to an operator's network without having a separate access unit.

A server-addition 270 may be a server having a function related to real-time communication, using the same hardware as the telecommunication device.

The gateway 190 may make the second network compatible with the telecommunication device 102. The second network may be the public switched telephone network connected via a network-placed gateway over a WAN. The connection to the PSTN may use a standardized recommendation like SIP connect or a telephony service provider's own recommendation.

The gateway-addition 280 may be a gateway making a device on the private domain of a communication network compatible with the telecommunication device.

Figure 6:
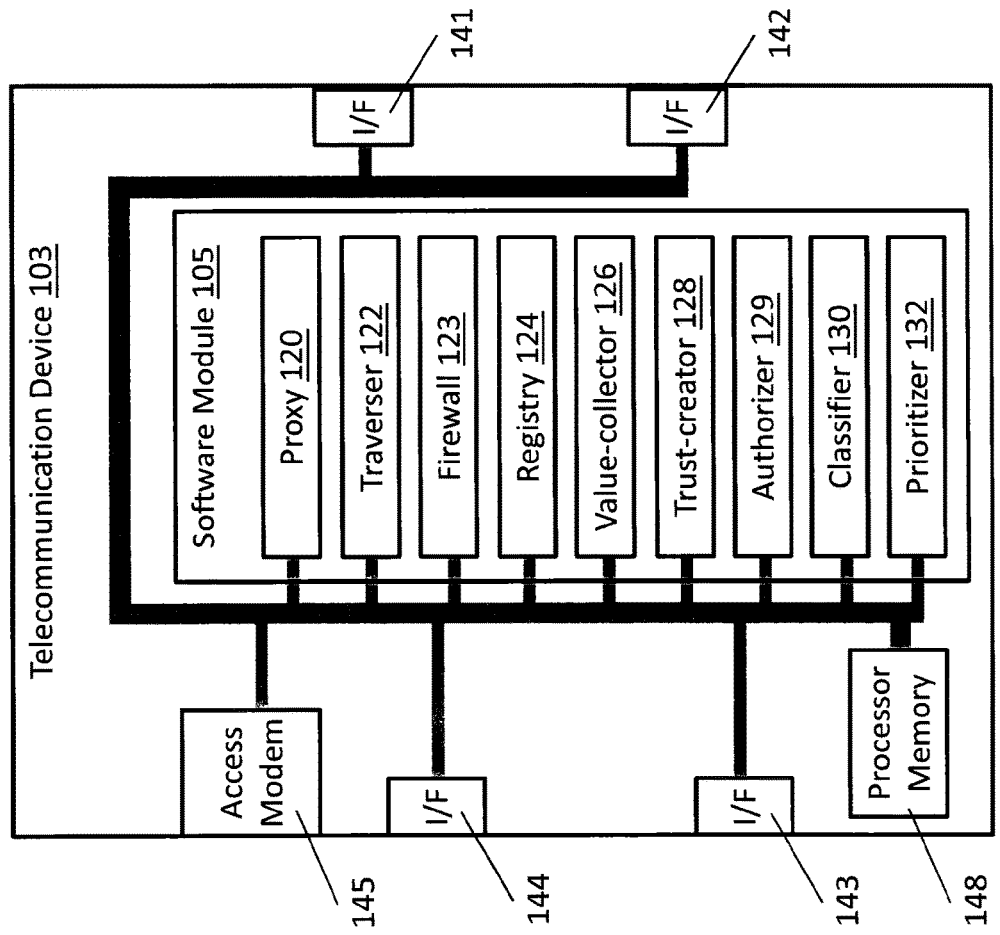
FIG. 6 shows a telecommunication device embodiment implemented in software.

FIG. 6 shows one embodiment of the telecommunication device 103 where the functions of a telecommunication device are implemented in a software module 105 that is executed by a hardware unit having processor and memory 148 and also may have interfaces 141 to 145 and other hardware components such as a modem 145. Such hardware units are generally available e.g. as servers or PC:s (Personal Computers). The functions of the telecommunication device can therefore be implemented as a software module to be incorporated into a hardware unit that may be a standard server, a PC or a specially built hardware, thereby making up the telecommunication device.

One purpose with the telecommunication devices is to be used in a system for communication over the global transport network.

Such system for communication can be used for services providing telephone calls, video conference calls, web browser calls, text messages, picture messages, voice messages, video messages, gaming applications, or applications for real-time communication.

The telecommunication device can also be used in a business method for offering charged communication services over a global transport network. Such charged communication services may be accessing said global transport network, text messaging, picture messaging, voice messaging, video messaging, real-time communication, voice communication or video communication.

The telecommunication device allows for a system where a user initiating a communication session (e.g. a call, a message, a gaming application, or other application) can be charged for a second user accepting the communication session. The second user may also influence the charge for the acceptance of the communication session. The telecommunicating device can retrieve information about the charge from a data base before the acceptance and may also retrieve the address, e.g. an IP address, for the communication session from the same data base.

The CDRs generated by the telecommunication device allow for business methods where revenue for charged services is shared between service providers and subscribers of the services. There can be user influenced charges for accepting a communication session and there can be different charges for different initiators or type of initiators of the communication session. The revenue from such charges services can be shared as exemplified by:

the charge for a communication session can be shared between the service provider from which the session was initiated and the service provider where the session was accepted as is common with telephony services, the service provider's revenue can be shared with the subscriber generating the charges, the service provider's revenue from charges for accepting calls can be shared with the subscriber accepting the calls, and the service provider's revenue from subscriber-determined charges for accepting calls can be shared with the subscriber determining the charges and accepting the calls.

A management system can be used for controlling the telecommunication devices in said system for communication. The management system can also control the access for a telecommunication device to the global transport network at the service provider side. To allow access, the management system may authenticate the telecommunication device, e.g. to avoid theft of service via a telecommunication device that is not authorized to use the global transport network.

The management system may also request that functions of the telecommunication device (e.g. the measurement, collection and delivery of value information) are validated (e.g. by performing a test of calculating a checksum of the program performing such function) to allow usage of the global transport network.

Figure 7A:
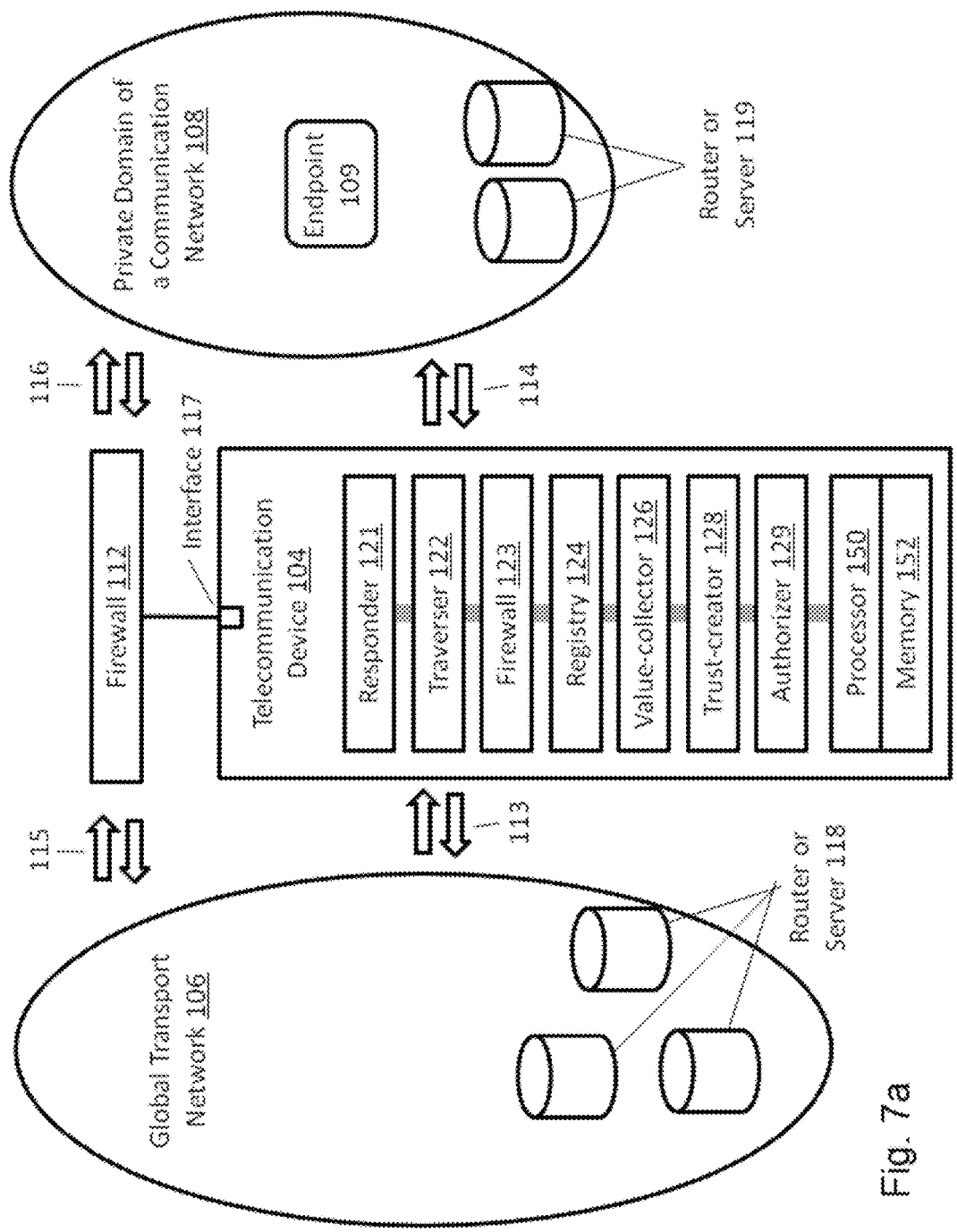
FIG. 7a shows a telecommunication device according to another embodiment.

In FIG. 7a is shown a telecommunication device 104 according to a further embodiment. As shown in FIG. 7a, the telecommunication device 104 is at a border between a global transport network 106 and a private domain of a communication network 108. The border may comprise a firewall 112.

This embodiment comprises a responder 121 and can be used when the communicating endpoints, which may be user terminals or servers, shall exchange real-time traffic and use a separate protocol for traversing a firewall. This separate protocol may be a combination of STUN (Session Traversal Utilities for NAT), TURN (Traversal Using Relays around NAT), ICE (Interactive Connectivity Establishment) or similar protocols for traversal of NAT (Network Address Translation) which is a function in a firewall.

The protocol used for initiating the real-time communication may be a signaling protocol like SIP (Session Initiation Protocol) or WebRTC (Web Real Time Communication). In case these signaling protocols use encryption between endpoints, which e.g. is the case when end-to-end TLS (transport layer security) transport is used, an intermediary device like the telecommunication device may not be able to interpret the initiating protocol.

However, the responder 121 in the telecommunication device 104 can via an interface to the private domain, interpret and act on the separate protocols for traversing a firewall such as STUN and TURN. These protocols are intended to use specific servers on the global transport network to traverse a firewall 112 that usually is unaware of theses protocols and of the initiating signaling protocol. Since the responder 121 acts upon the separate protocols for traversing a firewall, no specific server, e.g. a TURN server, on the global transport network for these protocols will be needed when using the telecommunication device 104.

The responder 121 interprets the separate protocols for traversing a firewall and uses the traverser 122 to set up a path between the global transport network 106 and a communicating endpoint 109 on the private domain 108 for the real-time traffic as described for other embodiments of the telecommunication device.

The responder 121 may also inform the endpoint 109 on the private domain 108 of the address of the path on the global transport network 106, whereby the endpoint 109 in the signaling protocol can pass the address to the other communicating endpoint reachable via the global transport network 106. The address can be the IP address and the transport port used.

The telecommunication device 104 can also authenticate the communicating endpoint 109 using methods in the separate protocols for traversing a firewall, instead of using an authentication method available in the signaling protocol as may be used in other embodiments of the telecommunication device.

Figure 7B:
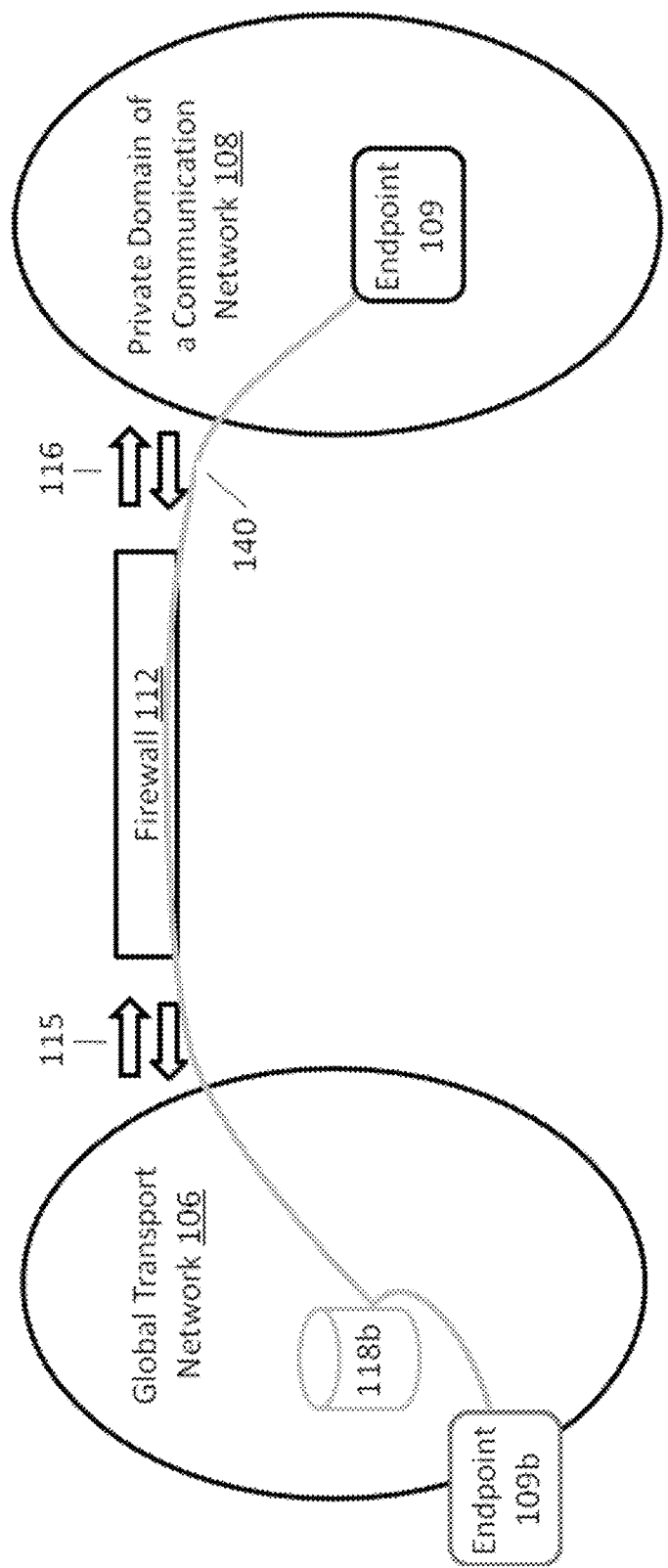
Figure 7C:
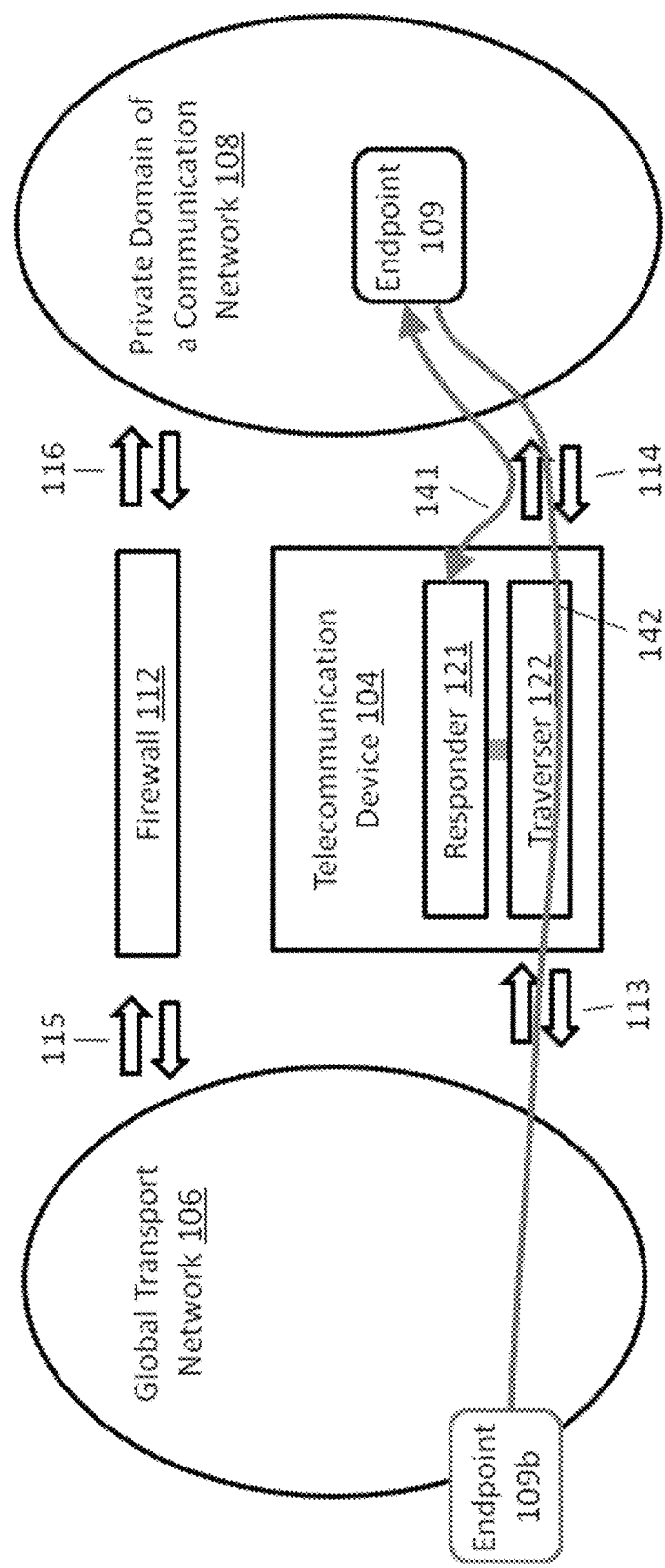
FIG. 7c is a deduction from FIG. 7a further showing components and functions.
Figure 7D:
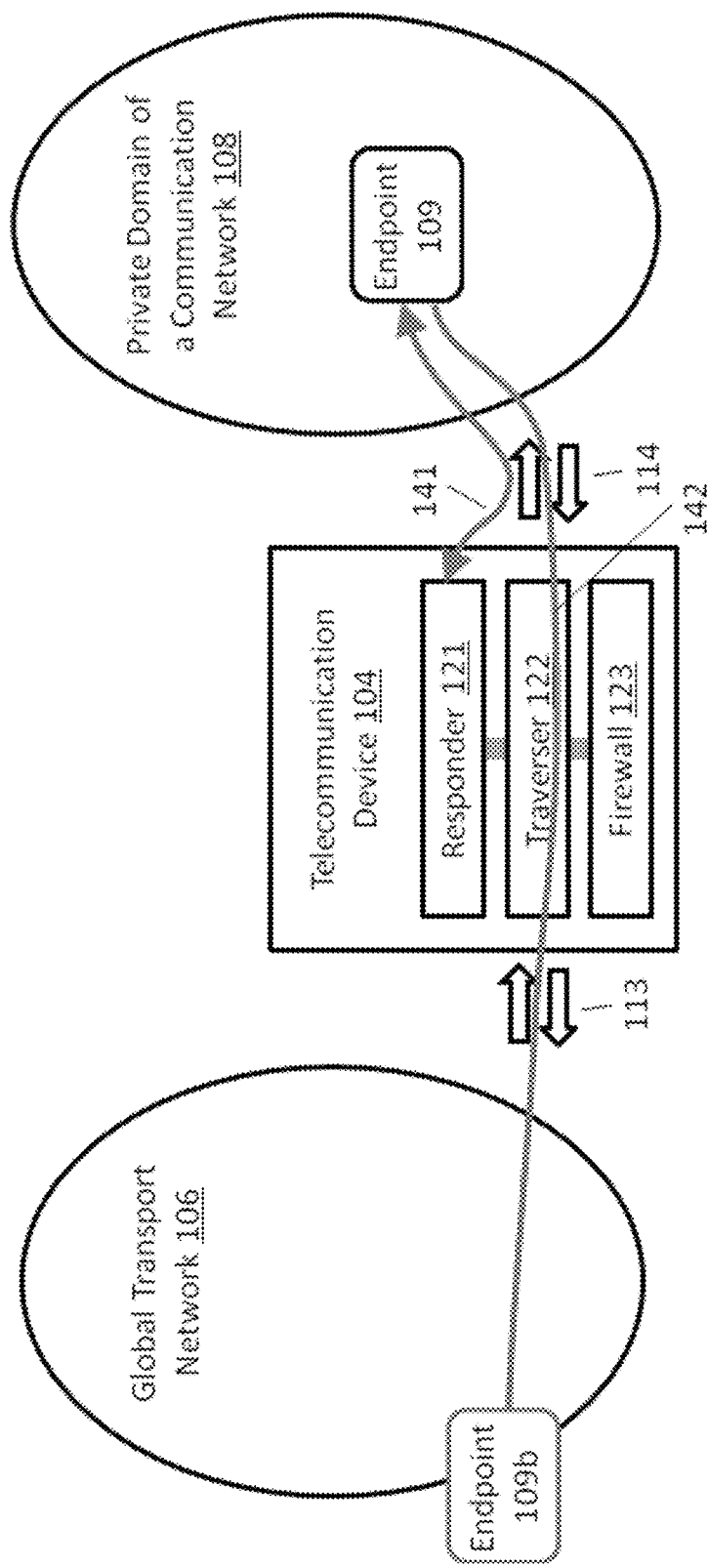

FIG. 7b is deduced from FIG. 7a and shows an endpoint 109 exchanging real-time traffic 140 through a firewall 112 via a TURN server 118b, which is set up using the TURN protocol, with another endpoint 109b reachable via the global transport network. The other endpoint 109b may be in another private domain or on the global transport network. FIG. 7c is also deduced from FIG. 7a and indicates how the responder 121 in an embodiment of telecommunication device 104 is signaled 141 by endpoint 109 to initiate a path 142 for real-time traffic between the global transport network and the private domain through the traverser 122 and signals 141 to inform endpoint 109 of the address of the path on the global transport network, which can be passed by endpoint 109 to the other endpoint 109b. FIG. 7d is also deducted from FIG. 7a and shows how a telecommunication device 104 in a further embodiment can be combined with a firewall 123, whereby traffic 113 and 114 can be both of data and of real-time type and the external firewall 112 of FIG. 7c can be replaced.

FIG. 3 shows a telecommunication device where the functions and features of the telecommunication device 104 in FIG. 7a are combined with other described functions and features of the telecommunication device. Such combination also includes the function-module 200, comprising programs for performing one or several of the functions listed above and shown in FIG. 4.

Figure 8:
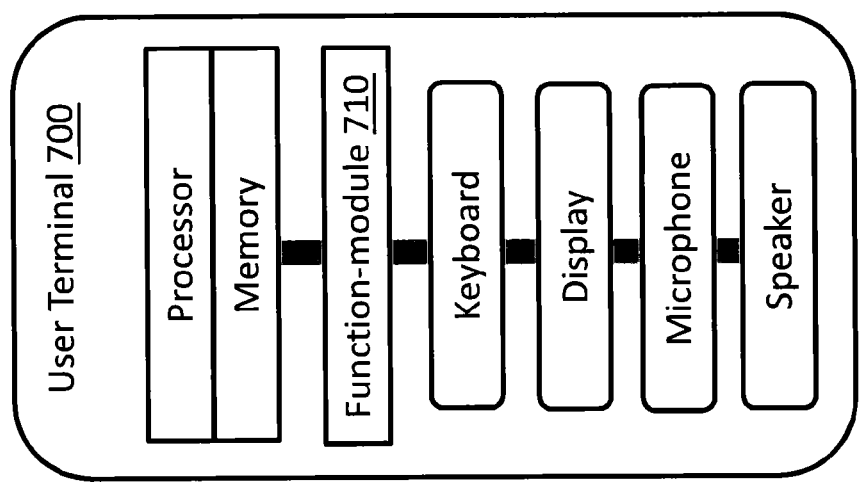
FIG. 8 shows a user terminal.
Figure 10:
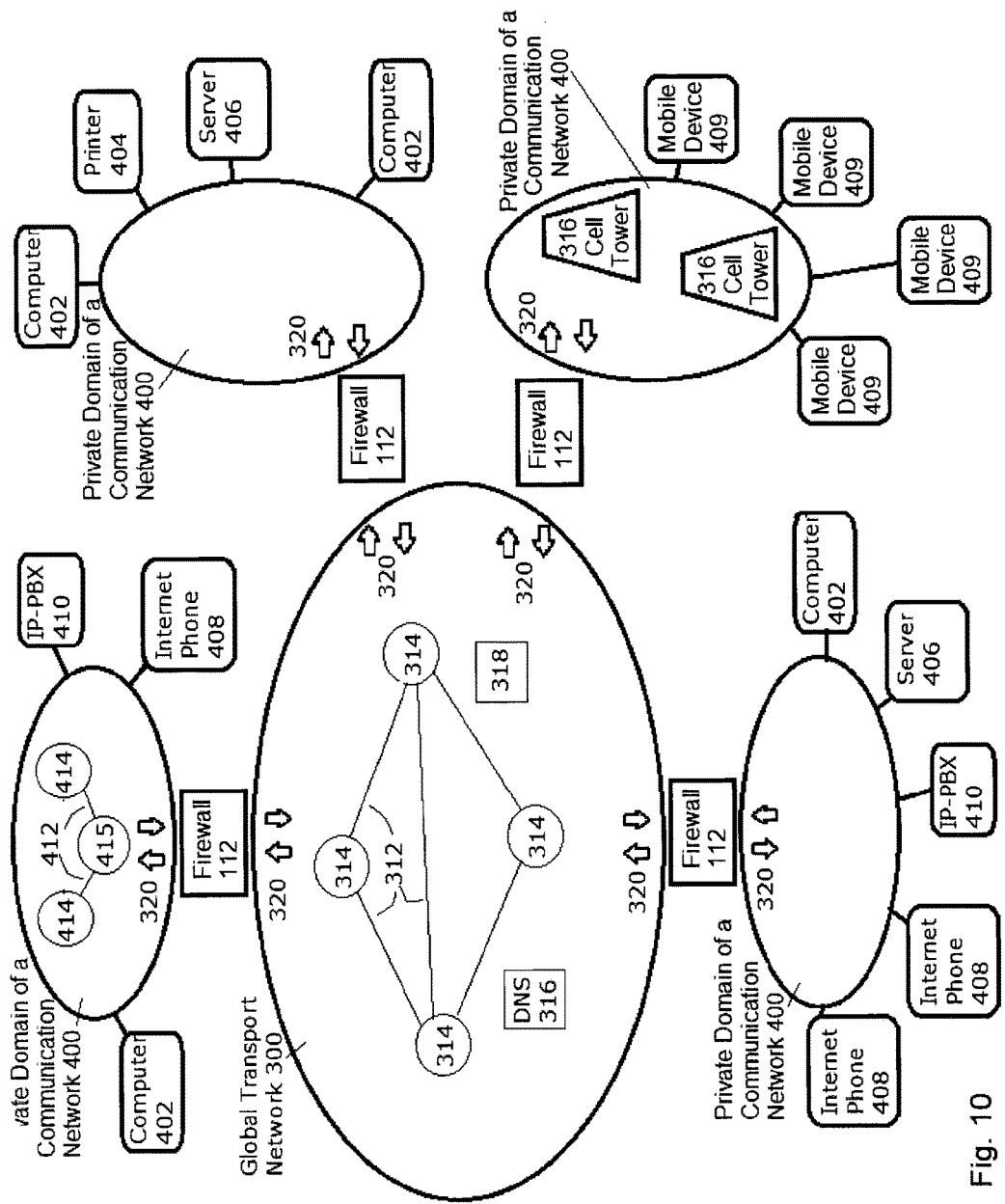
FIG. 10 shows a global transport network, private domains of a communication network.

As shown in FIG. 10, there are user terminals such as computers 402, internet phones 408, mobile devices 409 and IP-PBXs that can be coupled to telecommunication devices if such are deployed at the locations of firewalls 112. User terminals 700 shown in FIG. 8 may include a function-module 710, comprising programs for performing one or several of the following functions shown in FIG. 9:

711 managing charges for a communication session,
712 informing a user about charges for a communication session,
713 allowing a user to accept a communication session with or without a charge being charged the initiator of the communication session,
714 allowing a user initiating said communication session to cancel a communication session if a charge for acceptance will be charged,
715 selecting a quality level for a communication session over the global transport network,
716 informing a user of the charges for a communication sessions during the communication session,
717 allowing a user to change a charge or a quality level for traffic during a communication session,
718 adapting a charge or a quality level based on a measured or an experienced quality of the communication session,
719 presetting a maximum charge that the user has to pay for usage of a communication service,
720 terminating usage of a communication service when a preset charge is reached,
721 presetting a maximum charge that the user has to pay for a time period,
722 inhibiting communication sessions for a remainder of a time period, that would impose further charging after a preset charge for a time period is reached,
723 allowing the user to preselect whether a communication session shall be rejected, allowed with a charge imposed by said second user or allowed without any charge imposed by said second user, and
724 reducing the frequency of keep-alive packets to keep a path open through a firewall.

Telecom operators today typically only offer:

a) the POTS (plain old telephone service) service, at low—but guaranteed—bandwidth (3.5 kHz) and usually at session based high price per bandwidth used, and b) the Internet with high bandwidth and usually at flat rate and low price per bandwidth, but only at best effort quality.

Telecom operators have used VoIP technology to produce a) above at lower cost.

The capability to offer global multimedia (wide band) communication with guaranteed quality exists in the core of today's IP networks, but is only offered as the subset b) above.

In one aspect, a device allows telecom operators to offer a better service and allow better usage of their networks.

The telecommunication device, software module, or system also allows telecom operators to charge for better services. They get lower cost and more reliable infrastructure by eliminating softswitches and SBCs (session border controllers) in their VoIP infra structure.

Users will then get new and better service offerings that can match the capabilities of today's terminals (mobile handsets, PCs, telepresence equipment). Such better services will also drive innovation and usage, e.g. for gaming or other applications. It will also reduce the need for travelling by instead having videoconferences, which is more efficient, less costly and better for the environment.

The telecommunication device, software module, or system also allows telecom operators to charge for better services. They get lower cost and more reliable infrastructure by eliminating softswitches and SBCs in their VoIP infra structure. The operators then do not have to protect the old, long outdated and expensive POTS service and do not get tied into an application specific network structure.

The ability to charge and bill prioritized data transfer separately from best effort traffic on a public communication network, would also motivate telecom operators to deploy and offer such quality global transport network. Good collection of value information—the measurement of services used and the resources consumed—and reporting of the value information will also allow and encourage service providers to offer new and better services and price plans to their customers.

A proxy for real-time communication, e.g. a SIP, H.323, RTSP or WebRTC proxy, is included to be able to provide some of the mentioned functions. This proxy also should also have the ability to route the real-time call to its destination.

The device, software module, system, or business model including good collection of value information and billing flexibility, will also allow new revenue sharing offerings by a service provider. For example a user could determine a price for accepting a call from an unknown caller, a charge that could avoid spam calling (spit), e.g. sale calls, and share revenue for accepting incoming calls with the service provider.

In FIG. 10 is shown a global transport network 300. The global transport network 300 may include optical or other cables 312 or radio links connected by servers or routers 314 to form a network. User terminals as well as servers, like DNS (Domain Name System) servers 316 for translation of symbolic addresses to actual addresses, or application servers 318, may be connected to the global transport network, but mostly these endpoints are instead connected to private domains of a communication network 400, like a local area network (LAN), being protected and shielded off from the global transport network by a firewall 112. The firewall may also include network address translation (NAT) giving private addresses to devices connected to the private domain of a communication network, so they cannot directly be addressed from the global transport network 300.

The purpose of a global transport network is to transport traffic 320 between users and servers at different locations, between private domains of a communication network or LANs at different locations and between LANs and users and servers at different locations. Many can access the global transport network, so it is not private. Many network service providers may have connected their networks to form a global transport network.

The global transport data network normally transports the traffic without interfering with it. The Internet is a global transport data network. The Internet currently transports all traffic as best effort, which means that real-time traffic are not prioritized by setting TOS or DSCP bits in IP packets.

In FIG. 10 is also shown private domains of a communication networks 400. A private domain of a communication network 400 may include copper or other cables 412 or wireless radio access like WiFi, connected by switches 415 or routers 414 to form a network, using protocols like IP on top of Ethernet, token ring, or ARCNET. Users use user terminals such as computers 402 and associated devices such as printers 404 and a server 406. The private domain of a communication network 400 may also include real-time communication devices such as Internet phones 408 or an IP-PBX 410. Real-time devices are often for person to person communication. The server 406, in particular, may have applications and data storage that are shared in common by the computers 402. A suite of application programs may be kept on the server 406 for users to download and run on one of the computers 402. A user of one of the computers 402 may be able to share files with other users of other computers 402 at the server 406. Finally, the LAN 400 might be administered by a single administrator.

A private domain of a communication network 400 is a private network, for home or company users, that is secure and protected from the global transport network by a firewall 112.

A private domain of a communication network may also be used by a service provider to have its application server 406 on. The firewall 112, keeping the private domain of a communication network secure and private from the global transport network, then have to open paths for the provided application, so it be used by their customers over the global transport network, e.g. as Internet or over the top (OTT) service.

A private domain of a communication network 400 may also be the part of a mobile wireless network where the broadband channels are supplied to the mobile devices (e.g. user terminals such as smart phones) 409 via radio waves, cell tower antennas 316 and land based network elements, until protected by a firewall at the border to a global transport network 320. This is similar to how the current over the top channel (OTT) is supplied to smartphones.

The telecommunication device can replace or be connected in parallel with firewalls 112 shown in FIG. 10.

Therefore, according to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The telecommunication device comprises a controller (CPU) (e.g., a hardware logic circuitry based computer processor that processes or executes instructions, namely software/program), computer readable recording media, transmission communication media interface (network interface), and/or a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A telecommunication device for real-time communication at a border between a global transport network and a private domain of a communication network, comprising:
   a memory; and
   a processor coupled to the memory;
   a traverser running on the processor, the traverser allowing real-time traffic initiated by a communication protocol to traverse a firewall at the border between the global transport network and the private domain, wherein the traversal is in parallel with a typical traffic path of the firewall, or an interface running on the processor for opening a path for real-time traffic traversing the firewall at the border between the global transport network and the private domain, wherein the traversal is in parallel with a typical traffic path of the firewall, the interface allowing real-time traffic initiated by the communication protocol to traverse the firewall,
   a proxy between the global transport network and the private domain, the proxy handling requests and responses of the communication and controlling the traversal,
   an authenticator running on the processor, the authenticator verifying that the telecommunication device is trusted by a communication participant and that the communication participant is trusted by the telecommunication device, and
   characterized by a registry or database lookup that the proxy controlling the traversal between the global transport network and the private domain of the communication network in the telecommunication device that is trusted by the communication participant uses to convert a telephone number or address used on the global transport network to a private address of an endpoint or another proxy in the private domain that is not directly addressable from the global transport network, after which the proxy sends a message to said endpoint or other proxy in the private domain informing the endpoint or the other proxy of an address in the private domain of the traversal path, after which the traffic is exchanged through the traversal path,
   whereby valuable real-time traffic safely can be directly delivered to endpoints in the private domain by a non-centralized global transport network.

2. A system for communication over a global transport network comprising:
   two or more telecommunication devices communicating over the global transport network and at least one endpoint being in a private domain communicating using real-time traffic through one of the telecommunication devices, the telecommunication device comprising:
   a memory; and
   a processor coupled to the memory;
   a traverser running on the processor, the traverser allowing real-time traffic initiated by a communication protocol to traverse a firewall at the border between the global transport network and the private domain, wherein the traversal is in parallel with a typical traffic path of the firewall, or an interface running on the processor for opening a path for real-time traffic traversing the firewall at the border between the global transport network and the private domain, wherein the traversal is in parallel with a typical traffic path of the firewall, the interface allowing real-time traffic initiated by the communication protocol to traverse the firewall,
   a proxy between the global transport network and the private domain, the proxy handling requests and responses of the real-time communication and controlling the traversal,
   an authenticator running on the processor, the authenticator verifying that the telecommunication device is trusted by a communication participant and that the communication participant is trusted by the telecommunication device, and
   characterized by a registry or database lookup that the proxy controlling the traversal between the global transport network and the private domain of the communication network in the telecommunication device that is trusted by the communication participant uses to convert a telephone number or address used on the global transport network to a private address of an endpoint or another proxy in the private domain that is not directly addressable from the global transport network, after which the proxy sends a message to said endpoint or other proxy in the private domain informing the endpoint or the other proxy of an address in the private domain of the traversal path, after which the traffic is exchanged through the traversal path,
   whereby valuable real-time traffic safely can be directly delivered to endpoints in the private domain by a non-centralized global transport network.

3. The system according to claim 2, used for a service, where the service is selected from the group consisting of:
   a telephone call,
   a video conference call,
   a web browser call,
   a text message,
   a picture message,
   a voice message,
   a video message,
   a gaming application, and
   an application for real-time communication.

4. The system according to claim 2, further comprising a business method for offering a communication service over a global transport network using the telecommunication device and executing the functions of said telecommunication device, where the usage of a feature is authorized by means in the telecommunication device.

5. The system of claim 4, where said communication service is selected from the group consisting of:
   accessing said global transport network,
   text messaging,
   picture messaging,
   voice messaging,
   video messaging,
   real-time communication,
   voice communication, and
   video communication.

6. The system of claim 4, wherein a user initiating a communication session of a communication service is charged for a second user accepting the communication session.

7. The system of claim 6, wherein said second user influences said charge for said acceptance of said communication session.

8. The system of claim 7, further comprising user terminals, the user terminals having a user terminal processor for executing a program, the program performing a function selected from the group consisting of:
   managing charges for said communication session,
   informing a user about charges for said communication session,
   allowing said second user to accept said communication session with or without said charges being charged said user initiating said communication session,
   allowing said user initiating said communication session to cancel said communication session if said charge for acceptance of said communication session will be charged said user initiating said communication session,
   selecting a quality level for a communication session over the global transport network,
   informing the user of the charge for a communication session during the communication session,
   allowing a user to change a charge or a quality level for traffic during a communication session,
   adapting a charge or a quality level based on a measured or an experienced quality of the communication session,
   presetting a maximum charge that the user has to pay for usage of a communication service,
   terminating usage of a communication service when a preset charge is reached,
   presetting a maximum charge that the user has to pay for a time period,
   inhibiting communication sessions for a remainder of a time period, that would impose further charging after a preset charge for a time period is reached,
   allowing the user to preselect whether a communication session shall be rejected, allowed with a charge imposed by said second user or allowed without any charge imposed by said second user, and
   reducing the frequency of keep-alive packets to keep a path open through a firewall.

9. The system of claim 6, comprising a telecommunication device with a processor for executing a program, the program performing a function selected from the group consisting of:
   retrieving information from a database about said charge for said acceptance of said communication session before completing said acceptance,
   transferring information about said charge for said acceptance of said communication session to said user initiating said communication session before completing said acceptance, and
   retrieving information from a database about both an address for the communication session and said charge for said acceptance of said communication session before completing said acceptance.

10. The system of claim 4, where revenue from said charged communication is shared based on a sharing model selected from the group consisting of:
    sharing a charge for a communication session between the service provider from which the session was initiated and second service provider where the session was accepted,
    sharing a service provider's revenue from subscriber-influenced charges for accepting a communication session with the subscriber that influenced the charge and accepted the session,
    sharing a service provider's revenue from charges for accepting a communication session with the subscriber that accepted the session, and
    sharing a service provider's revenue with the subscriber that generated the charges.

11. The system of claim 2, where a management system for the telecommunication device also controls the access to the global transport network for the telecommunication device.

12. The system of claim 11, where said management system authenticates said telecommunication device to allow access to said global transport network for said telecommunication device.

13. The system of claim 11, where said management system validates a function of said telecommunication device to allow usage of said global transport network for said telecommunication device.

14. A method for real-time communication in a telecommunication software product at a border between a global transport network and a private domain of a communication network, the method comprising:
    storing the telecommunication software product in a memory and executing the telecommunication software product in a processor coupled to the memory,
    running a traverser on the processor, the traverser allowing real-time traffic initiated by a communication protocol to traverse a firewall at the border between the global transport network and the private domain, wherein the traversal is in parallel with a typical traffic path of the firewall, or running an interface on the processor for opening a path for real-time traffic traversing the firewall at the border between the global transport network and the private domain, wherein the traversal is in parallel with a typical traffic path of the firewall, the interface allowing real-time traffic initiated by the communication protocol to traverse the firewall,
    disposing a proxy between the global transport network and the private domain, the proxy handling requests and responses of the communication and controlling the traversal, and
    running an authenticator on the processor, the authenticator verifying that the telecommunication device is trusted by a communication participant and that the communication participant is trusted by the telecommunication device,
    characterized by using, by the proxy controlling the traversal between the global transport network and the private domain of the communication network in the telecommunication device that is trusted by the communication participant, a registry or database lookup to convert a telephone number or address used on the global transport network to a private address of an endpoint or another proxy in the private domain that is not directly addressable from the global transport network, after which the proxy sends a message to said endpoint or other proxy in the private domain informing the endpoint or the other proxy of an address in the private domain of the traversal path, after which the traffic is exchanged through the traversal path,
    whereby valuable real-time traffic safely can be directly delivered to endpoints in the private domain by a non-centralized global transport network.

15. The method of claim 14, further comprising performing a function selected from the group consisting of:
  responding to an authenticating request from a service provider,
  responding to a verification request from a service provider,
  authenticating a communication participant,
  authentication using a VPN (Virtual Private Network),
  authentication using a private IP line,
  responding to an authentication request from a communication participant,
  verifying that the telecommunication device is trusted by a communication participant and that the communication participant is trusted by the telecommunication device,
  authorizing usage of a feature for a communication participant,
  routing real-time traffic between two communication participants,
  collecting user feedback,
  collecting votes,
  compiling call detail records that are used by a service provider for a monitoring purpose,
  compiling call detail records that are used by a service provider for a billing purpose,
  verifying the program for creating and delivering call detail records,
  delivering call detail records,
  delivering the call detail records over the global transport network using a secure protocol,
  delivering the call detail records to a party different than the transport network service provider,
  delivering the call detail records to several parties,
  converting a telephone number to an address on the global transport network,
  converting a first form of address to an address on the global transport network,
  retrieving an address on the global transport network by external data base lookup,
  retrieving an address on the global transport network by ENUM lookup,
  responding to authentication requests for permission to use an external data base for converting an address,
  routing a call to a destination over the global transport network,
  classifying traffic based on a service to which a user of the telecommunication device is subscribed,
  classifying traffic based on a protocol used,
  classifying traffic based on an interface used,
  classifying traffic based on an address used by a caller,
  classifying traffic based on a port used by a caller,
  classifying traffic based on in which order traffic channels are set up,
  classifying traffic based on the number of traffic channels that are set up,
  classifying traffic based on the identity of a communication participant,
  classifying traffic based on a quality marking of data packets that are received,
  prioritizing traffic by placing prioritized data packets before other data packets in a queue,
  prioritizing traffic by marking data packets,
  prioritizing traffic by selecting a specific protocol,
  prioritizing traffic by reserving bandwidth,
  prioritizing traffic by selecting a specific network,
  prioritizing traffic by selecting a specific subnet,
  prioritizing traffic by selecting a specific network interface,
  registering user's current location,
  providing a service of a PBX,
  adding location information to an emergency call or message,
  forwarding location information of an emergency call or message,
  intercepting a call for eavesdropping,
  intercepting a message for interpreting, and
  measuring and collecting value information about traffic as the traffic traverses the firewall.

16. The method of claim 14, further comprising selecting said secure protocol used to deliver said call detail records from the group consisting of:
  TR-069 (a Broadband Forum specification),
  Diameter (an IETF standard), and
  SFTP (Secure File Transfer Protocol).

17. The method of claim 14, further comprising basing said authenticator on an indication of trust selected from the group consisting of:
  a shared secret,
  a password,
  a certificate,
  a chip card,
  a SIM card,
  a VPN (Virtual Private Network),
  a private IP line,
  an encrypted tunnel,
  a private LAN (Local Area Network),
  a TLS connection,
  a PKI (Public Key Infrastructure),
  a RADIUS (Remote Authentication Dial In User Service) server,
  a Diameter server,
  a unique identifier,
  a MAC address, and
  an IP address.

18. The method of claim 14, further comprising reaching the global transport network via a path in a firewall.

19. The method of claim 18, further comprising keeping said path in said firewall open by keep-alive packets through said firewall.

20. The method of claim 19, further comprising reducing the frequency of said keep-alive packets between the telecommunication device and a user terminal at said private domain of a communication network.

21. The method of claim 14, further comprising connecting a plurality of WAN interfaces to a plurality of global transport networks, at least one of the global transport networks having a different quality level.

22. The method of claim 21, further comprising allowing real-time communication on the private domain of a communication network to be routed either via a WAN interface connected to an Internet or via a WAN interface connected to a higher-quality network.

23. The method of claim 14, further comprising protecting the private domain of a communication network from unwanted traffic from the global transport network with a firewall.

24. The method of claim 14, further comprising selecting an access modem for connecting to the global transport network from the group consisting of:
  a DSL modem,
  a cable modem,
  a GPON modem,
  an Ethernet router, an optical fiber router,
MPLS router, and
a T1 router.

25. The method of claim 14, further comprising selecting servers from the group consisting of:
a SIP Server,
a SIP registrar,
a PBX,
a presence server, and
a call and message policy handler.

26. The method of claim 14, further comprising communicating with a second network with a gateway, the gateway making the second network compatible with the telecommunication device.

27. The method of claim 26, wherein said second network is the Public Switched Telephone Network.

28. The method of claim 14, further comprising communicating with a second device on the private domain of a communication network that is not directly compatible with the telecommunication device with a gateway.

29. The method of claim 28, further comprising selecting said second device from the group consisting of:
a telephone,
a PBX,
a device for the Public Switched Telephone Network,
a device using the protocol H.323,
a device using the protocol MGCP, and
a device using a protocol that is not used by the telecommunication device.

30. A telecommunication device at a border between a global transport network and a private domain of a communication network, where the border typically is at a location of a firewall, for the telecommunication device to traverse the border with real-time traffic in parallel with the firewall location, wherein a first endpoint in the private domain communicates using real-time traffic with a second endpoint reachable via the global transport network, and where the first endpoint and the second endpoint use a signaling protocol for an intended real-time communication and a separate second protocol for traversing the border with real-time traffic in parallel with the firewall location, initiated by the signaling protocol,
the telecommunication device comprising:
a memory; and
a processor coupled to the memory;
a responder with an interface to the private domain; and
a traverser at the border between the global transport network and the private domain for the second protocol and running on the processor,
wherein the responder sets up a path through the traverser for real-time traffic in parallel with the firewall location and informs the first endpoint of an address of the path on the global transport network, and
wherein the second endpoint sends real-time traffic to the address of the path on the global transport network as specified by the second protocol, said address being provided to the second endpoint by the first endpoint via the signaling protocol.

31. The telecommunication device of claim 30, where said signaling protocol is SIP, WebRTC or another real-time signaling protocol and said second protocol is a combination of STUN, TURN, ICE or other protocols for traversing NAT.

32. The telecommunication device of claim 30, wherein the signaling protocol is encrypted between the first and the second endpoints.

33. A method for real-time communication in a telecommunication software product at a border between a global transport network and a private domain of a communication network, where the border typically is at a location of a firewall, and traversing the border with real-time traffic in parallel with the firewall location, wherein a first endpoint in the private domain communicates using real-time traffic with a second endpoint reachable via the global transport network, and where the first endpoint and the second endpoint use a signaling protocol for an intended real-time communication and a separate second protocol for traversing the border with real-time traffic in parallel with the firewall location, initiated by the signaling protocol, the method comprising:
storing the telecommunication software product in a memory and executing the telecommunication software product in a processor coupled to the memory,
disposing a responder with an interface to the private domain; and
disposing a traverser at the border between the global transport network and the private domain for the second protocol,
setting up a path, by the responder, through the traverser for real-time traffic in parallel with the firewall location and informing the first endpoint of an address of the path on the global transport network, and
sending real-time traffic, by the second endpoint, to the address of the path on the global transport network as specified by the second protocol, said address being provided to the second endpoint by the first endpoint via the signaling protocol.

34. The method of claim 33, further comprising performing a function selected from the group consisting of:
responding to an authenticating request from a service provider,
responding to a verification request from a service provider,
authenticating a communication participant,
authentication using a VPN (Virtual Private Network),
authentication using a private IP line,
responding to an authentication request from a communication participant,
verifying that the telecommunication device is trusted by a communication participant and that the communication participant is trusted by the telecommunication device,
authorizing usage of a feature for a communication participant,
routing real-time traffic between two communication participants,
collecting user feedback,
collecting votes,
compiling call detail records that are used by a service provider for a monitoring purpose,
compiling call detail records that are used by a service provider for a billing purpose,
verifying the program for creating and delivering call detail records,
delivering call detail records,
delivering the call detail records over the global transport network using a secure protocol,
delivering the call detail records to a party different than the transport network service provider,
delivering the call detail records to several parties,
converting a telephone number to an address on the global transport network,
converting a first form of address to an address on the global transport network, retrieving an address on the global transport network by external data base lookup,
retrieving an address on the global transport network by ENUM lookup,
responding to authentication requests for permission to use an external data base for converting an address,
routing a call to a destination over the global transport network,
classifying traffic based on a service to which a user of the telecommunication device is subscribed,
classifying traffic based on a protocol used,
classifying traffic based on an interface used,
classifying traffic based on an address used by a caller,
classifying traffic based on a port used by a caller,
classifying traffic based on in which order traffic channels are set up,
classifying traffic based on the number of traffic channels that are set up,
classifying traffic based on the identity of a communication participant,
classifying traffic based on a quality marking of data packets that are received,
prioritizing traffic by placing prioritized data packets before other data packets in a queue,
prioritizing traffic by marking data packets,
prioritizing traffic by selecting a specific protocol,
prioritizing traffic by reserving bandwidth,
prioritizing traffic by selecting a specific network,
prioritizing traffic by selecting a specific subnet,
prioritizing traffic by selecting a specific network interface,
registering user's current location,
providing a service of a PBX,
adding location information to an emergency call or message,
forwarding location information of an emergency call or message,
intercepting a call for eavesdropping,
intercepting a message for interpreting,
measuring and collecting value information about the real-time traffic over the global transport network, and
authorizing usage of a feature of the telecommunication device by the communication participant after trust has been verified.

35. A system for communication over a global transport network using at least one telecommunication device at a border between the global transport network and a private domain of a communication network, where the border typically is at a location of a firewall, for the telecommunication device to traverse the border with real-time traffic in parallel with the firewall location, wherein a first endpoint in the private domain communicates using real-time traffic with a second endpoint reachable via the global transport network, and where the first endpoint and the second endpoint use a signaling protocol for an intended real-time communication and a separate second protocol for traversing the border with real-time traffic in parallel with the firewall location, initiated by the signaling protocol,
the telecommunication device comprising:
a memory; and
a processor coupled to the memory;
a responder with an interface to the private domain; and
a traverser at the border between the global transport network and the private domain for the second protocol and running on the processor,
wherein the responder sets up a path through the traverser for real-time traffic in parallel with the firewall location and informs the first endpoint of an address of the path on the global transport network, and
wherein the second endpoint sends real-time traffic to the address of the path on the global transport network as specified by the second protocol, said address being provided to the second endpoint by the first endpoint via the signaling protocol.

36. The system according to claim 35, further comprising a business method for offering a communication service over a global transport network using the telecommunication device and executing the functions of said telecommunication device, where the usage of a feature is authorized by means in the telecommunication device.

37. The system of claim 36, wherein a user initiating a communication session of a communication service is charged for a second user accepting the communication session.

38. The system of claim 37, wherein said second user influences said charge for said acceptance of said communication session.

39. The system of claim 37, further comprising user terminals, the user terminals having a user terminal processor for executing a program, the program performing a function selected from the group consisting of:
managing charges for said communication session,
informing a user about charges for said communication session,
allowing said second user to accept said communication session with or without said charges being charged said user initiating said communication session,
allowing said user initiating said communication session to cancel said communication session if said charge for acceptance of said communication session will be charged said user initiating said communication session,
selecting a quality level for a communication session over the global transport network,
informing the user of the charge for a communication session during the communication session,
allowing a user to change a charge or a quality level for traffic during a communication session,
adapting a charge or a quality level based on a measured or an experienced quality of the communication session,
presetting a maximum charge that the user has to pay for usage of a communication service,
terminating usage of a communication service when a preset charge is reached,
presetting a maximum charge that the user has to pay for a time period,
inhibiting communication sessions for a remainder of a time period, that would impose further charging after a preset charge for a time period is reached,
allowing the user to preselect whether a communication session shall be rejected, allowed with a charge imposed by said second user or allowed without any charge imposed by said second user, and
reducing the frequency of keep-alive packets to keep a path open through a firewall.

40. A telecommunication device for transferring real-time traffic between a global transport network and a private domain of a communication network separated by a firewall, comprising:
a memory; and
a processor coupled to the memory for executing a program, a traverser running on the processor, the traverser allowing real-time traffic to traverse the firewall at the border between the global transport network and the private domain of a communication network, wherein the traversal is in parallel with a typical traffic path of the firewall, a proxy between the global transport network and the private domain running on the processor, the proxy handling requests and responses of a communication protocol and controlling the traverser, an authenticator running on the processor, the authenticator verifying that the telecommunication device is trusted by a communication participant and that the communication participant is trusted by the telecommunication device, and characterized by a registry or database lookup that the proxy controlling the traversal between the global transport network and the private domain of the communication network in the telecommunication device that is trusted by the communication participant uses to convert a telephone number or address used on the global transport network to a private address of an endpoint or another proxy in the private domain that is not directly addressable from the global transport network, after which the proxy sends a message to said endpoint or other proxy in the private domain informing the endpoint or the other proxy of an address in the private domain of the traversal path, after which the traffic is exchanged through the traversal path, whereby valuable real-time traffic safely can be directly delivered to endpoints in the private domain by a non-centralized global transport network.

* * * * *